United States Patent
Kasina

(10) Patent No.: US 10,083,162 B2
(45) Date of Patent: Sep. 25, 2018

(54) CONSTRUCTING A NARRATIVE BASED ON A COLLECTION OF IMAGES

(71) Applicant: Microsoft Technology Licensing, LLC, Redmond, WA (US)

(72) Inventor: Harish Kasina, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/362,542

(22) Filed: Nov. 28, 2016

(65) Prior Publication Data

US 2018/0150444 A1 May 31, 2018

(51) Int. Cl.
*G06F 17/00* (2006.01)
*G06F 17/24* (2006.01)
*G06F 17/30* (2006.01)

(52) U.S. Cl.
CPC .......... *G06F 17/241* (2013.01); *G06F 17/248* (2013.01); *G06F 17/30056* (2013.01)

(58) Field of Classification Search
CPC ................................................ G06F 17/30056
See application file for complete search history.

(56) References Cited

U.S. PATENT DOCUMENTS

| | | | |
|---|---|---|---|
| 5,623,589 A | 4/1997 | Needham et al. | |
| 6,111,586 A * | 8/2000 | Ikeda | G06T 11/60 345/619 |
| 6,804,684 B2 * | 10/2004 | Stubler | G06F 17/30256 |
| 6,810,146 B2 | 10/2004 | Loui et al. | |
| 6,813,618 B1 * | 11/2004 | Loui | G06F 17/30256 |
| 6,973,453 B2 * | 12/2005 | Culp | G06F 17/30256 |
| 7,043,488 B1 * | 5/2006 | Baer | G06F 17/3002 |
| 7,127,671 B1 * | 10/2006 | McDonald | G06F 17/24 715/246 |
| 7,930,647 B2 | 4/2011 | Skrenta | |
| 8,417,000 B1 | 4/2013 | Mendis | |

(Continued)

FOREIGN PATENT DOCUMENTS

EP 3035233 A1 6/2016

OTHER PUBLICATIONS

Kassarnig, Valentin, "Political Speech Generator," available at <<https://github.com/valentin012/conspeech>>, GitHub, Inc., retrieved on Nov. 26, 2016, 1 page.

Kassarnig, Valentin, "Political Speech Generation," available at <<https://arxiv.org/pdf/1601.03313v2.pdf>>, arXiv:1601.03313v2 [cs.CL], Jan. 20, 2016, 13 pages.

(Continued)

*Primary Examiner* — Laurie A Ries

(74) *Attorney, Agent, or Firm* — Rainier Patents, P.S.

(57) ABSTRACT

A computer-implemented technique is described for generating a textual narrative based on a set of input images. In one scenario, the end user captures the set of input images while visiting one or more locations. The generated narrative describes the user's travel experience at those locations in a cohesive manner. In one implementation, the technique generates the narrative based on information extracted in offline fashion by a knowledge acquisition component. The knowledge acquisition component, in turn, produces the knowledgebase by mining one or more knowledge sources (such as one or more travel blogs) that provide image-annotated textual travel narratives. The technique can therefore be said to reuse common elements in the travel narratives of others in describing the user's own set of input images.

20 Claims, 11 Drawing Sheets

(56) References Cited

U.S. PATENT DOCUMENTS

| | | | | |
|---|---|---|---|---|
| 8,477,994 | B1* | 7/2013 | Noshadi | H04N 1/00167 382/103 |
| 8,488,023 | B2 | 7/2013 | Bacivarov et al. | |
| 8,842,875 | B2* | 9/2014 | Rodriguez | H04N 1/32122 382/100 |
| 9,042,646 | B2* | 5/2015 | Das | G06F 17/30056 382/170 |
| 9,727,546 | B1* | 8/2017 | Noshadi | G06F 17/241 |
| 2002/0188602 | A1* | 12/2002 | Stubler | G06F 17/30256 |
| 2008/0050039 | A1* | 2/2008 | Jin | G06F 17/248 382/284 |
| 2008/0126942 | A1* | 5/2008 | Lee | G06F 17/30265 715/730 |
| 2008/0166106 | A1* | 7/2008 | Ozawa | G11B 27/34 386/244 |
| 2008/0304808 | A1* | 12/2008 | Newell | G06F 17/30029 386/278 |
| 2010/0284625 | A1 | 11/2010 | Wang et al. | |
| 2010/0312808 | A1* | 12/2010 | Mehta | G06F 17/30749 707/825 |
| 2011/0145327 | A1* | 6/2011 | Stewart | G06F 17/3002 709/203 |
| 2011/0283172 | A1* | 11/2011 | Berger | G06Q 10/10 715/202 |
| 2011/0283190 | A1 | 11/2011 | Poltorak | |
| 2011/0307491 | A1* | 12/2011 | Fisk | G06F 17/30056 707/741 |
| 2012/0013640 | A1* | 1/2012 | Chen | G06T 11/60 345/619 |
| 2012/0110432 | A1 | 5/2012 | Mei et al. | |
| 2012/0114249 | A1* | 5/2012 | Conwell | G06F 17/30265 382/190 |
| 2012/0117473 | A1* | 5/2012 | Han | G11B 27/034 715/723 |
| 2012/0323930 | A1 | 12/2012 | Kennberg et al. | |
| 2013/0004073 | A1* | 1/2013 | Yamaji | G06T 11/60 382/173 |
| 2013/0073971 | A1* | 3/2013 | Huang | G06Q 50/01 715/738 |
| 2013/0101231 | A1* | 4/2013 | Cok | G06F 17/3028 382/224 |
| 2013/0144959 | A1 | 6/2013 | Chen et al. | |
| 2013/0174017 | A1 | 7/2013 | Richardson et al. | |
| 2013/0188835 | A1 | 7/2013 | Higa et al. | |
| 2013/0198602 | A1* | 8/2013 | Kokemohr | G06F 17/30011 715/233 |
| 2014/0079324 | A1* | 3/2014 | Ishige | G06T 11/60 382/224 |
| 2014/0119652 | A1* | 5/2014 | Das | G06F 17/30056 382/170 |
| 2014/0192229 | A1 | 7/2014 | Kim et al. | |
| 2014/0229476 | A1* | 8/2014 | Fouad | G06F 17/3069 707/729 |
| 2015/0020170 | A1* | 1/2015 | Talley | H04L 63/08 726/4 |
| 2015/0143236 | A1* | 5/2015 | Tena Rodriguez | G06F 17/212 715/273 |
| 2015/0331566 | A1* | 11/2015 | Yonaha | G06K 9/00221 715/776 |
| 2016/0203137 | A1 | 7/2016 | Sabah et al. | |

OTHER PUBLICATIONS

"Generating Stories about Images," available at <<https://medium.com/@samim/generating-stories-about-images-d163ba41e4ed#.rub0ywswu>>, Medium Corporation, Nov. 5, 2015, 9 pages.

Kiros, Jamie Ryan, "neural-storyteller, A recurrent neural network for generating little stories about images," available at <<https://github.com/ryankiros/neural-storyteller>>, GitHub, Inc., retrieved on Nov. 26, 2016, 4 pages.

Karparthy, et al., "Deep Visual-Semantic Alignments for Generating Image Descriptions," available at <<http://cs.stanford.edu/people/karpathy/deepimagesent/>>, in Proceedings of the 28th IEEE Conference on Computer Vision and Pattern Recognition (CVPR), Jun. 2015, 17 pages.

Cho, et al., "On the Properties of Neural Machine Translation: Encoder—Decoder Approaches," available at <<https://arxiv.org/pdf/1409.1259v2.pdf>>, arXiv:1409.1259v2 [cs.CL], Oct. 7, 2014, 9 pages.

Moynihan, Tim, "Google Photos Now Builds Perfect Vacation Albums on Its Own," Wired, Mar. 22, 2016, 5 pages.

<CaptionBot (/), available at <<https://www.captionbot.ai/>>, Microsoft Corporation, Redmond, WA, accessed on Nov. 26, 2016, 2 pages.

Karpathy, Andrej, "NeuralTalk Sentence Generation Results," available at <<http://cs.stanford.edu/people/karpathy/deepimagesent/generationdemo/>>, accessed on Nov. 26, 2016, 10 pages.

Karpathy, Andrej, "neuraltalk," available at <<https://github.com/karpathy/neuraltalk>>, GitHub, Inc., retrieved on Nov. 26, 2016, 3 pages.

"Picture this: Microsoft Research project can interpret, caption photos," available at <<http://blogs.microsoft.com/next/2015/05/28/picture-this-microsoft-research-project-can-interpret-caption-photos/#sm.0000sbyea23rtcqlyoy1tjgsp3nh6>>, Microsoft Corporation, Redmond, WA, accessed on Nov. 26, 2016, 6 pages.

Krizhevsky, et al., "ImageNet Classification with Deep Convolutional Neural Networks," in Proceedings of the Advances in Neural Information Processing Systems, 2012, 9 pages.

Fang, et al., "From Captions to Visual Concepts and Back," available at <<https://arxiv.org/pdf/1411.4952v3.pdf>>, arXiv:1411.4952v3 [cs.CV], Apr. 14, 2015, 10 pages.

He, Xiaodong, "Towards Human Quality Image Captioning: Deep Semantic Learning of Text and Images," available at <<https://www.microsoft.com/en-us/research/publication/towards-human-quality-image-captioning-deep-semantic-learning-of-text-and-images-invited-talk/>>, Invited Talk at INNS Deep Learning Workshop, Aug. 8, 2015, 43 pages.

Barzilay, et al., "Sentence Ordering in Multidocument Summarization," in Proceedings of the First International Conference on Human Language Technology Research, 2001, 7 pages.

Donghong, et al., "Sentence Ordering based on Cluster Adjacency in Multi-Document Summarization," in Proceedings of the International Joint Conference on Natural Language Processing, 2008, 6 pages.

Dimitromanolaki, et al., "Learning to Order Facts for Discourse Planning in Natural Language Generation," in Proceedings of EACL 2003 Workshop on Natural Language Generation, 2003, 8 pages.

Shen, et al., "A Latent Semantic Model with Convolutional-Pooling Structure for Information Retrieval," in Proceedings of the 23rd ACM International Conference on Conference on Information and Knowledge Management, Nov. 2014, 10 pages.

* cited by examiner

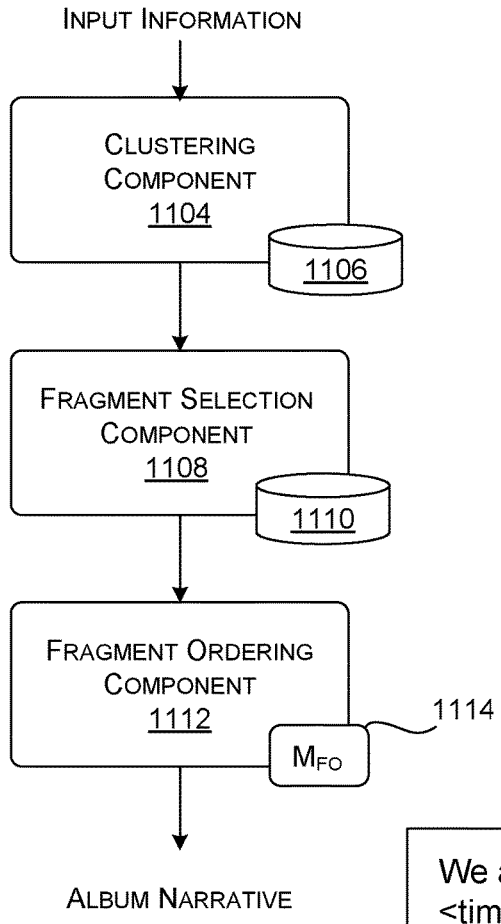
FIG. 11
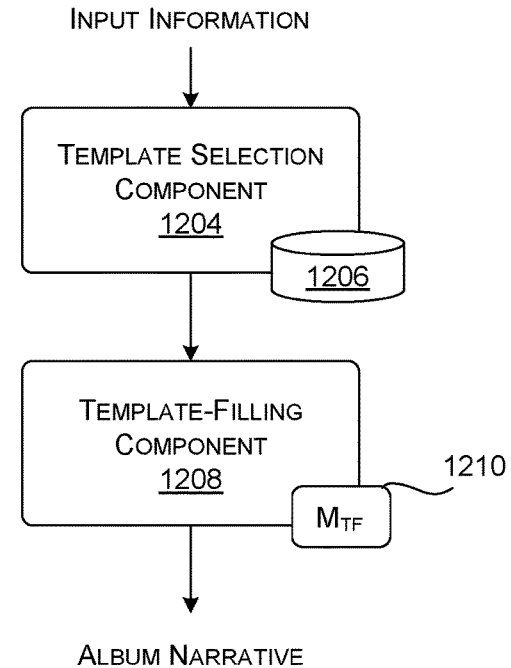
FIG. 12
We arrived at <location> at around <time>. It was <environmental condition>. We saw <feature of location>. As explained to us, <background information regarding feature of the location>. We <activity performed> and felt <emotion>.
We next arrived at <location> . . . .
1302
FIG. 13

CONSTRUCTING A NARRATIVE BASED ON A COLLECTION OF IMAGES

BACKGROUND

Technology currently allows users to generate and store a large number of digital media items. While on a vacation, for instance, a user may use his or her digital camera, smartphone or wearable computing device to produce dozens of digital photographs that describe his or her travel experience. The user may then transfer these digital photographs to a personal computer and/or a cloud storage service.

A user who captures a large number of digital photographs is faced with the subsequent task of organizing and managing those digital photographs. In traditional practice, a user may perform this task by manually organizing the digital photographs into meaningful folders. Further, a user may manually annotate individual digital photographs with descriptive labels. But this process is labor intensive and tedious in nature. Many users grudgingly perform this task, if at all.

Failure to properly organize a collection of digital photographs may impede the user's later interaction with (and enjoyment of) the digital photographs. A poorly organized corpus of digital photographs may also prevent the user from quickly and effectively sharing his or her digital photographs with others

SUMMARY

A computer-implemented technique is described for automatically (or semi-automatically) generating a textual narrative based on a set of input images. In one scenario, the end user captures the set of input images while visiting one or more locations. The generated narrative describes the user's travel experience at those locations in a cohesive manner.

In one implementation, the technique generates the narrative based on information extracted in offline fashion by a knowledge acquisition component. The knowledge acquisition component, in turn, produces the knowledgebase by mining one or more knowledge sources (such as one or more travel blogs) that provide image-annotated travel narratives. The technique can therefore be said to reuse common elements in the travel narratives of others in describing the user's own set of input images.

According to another illustrative aspect, the technique provides a narrative that is sensitive to nuanced attribute information obtained from the set of input images. Such attribute information describes, for instance, locations, environmental conditions, objects (e.g., landmarks), actions, relationship types, emotions, etc., expressed in the input images.

Overall, the computer-implemented technique provides an efficient mechanism for organizing and presenting digital media items. The technique facilitates the ability of the user to later enjoy his or her own media items, and to also share the media items with others in a timely manner. The technique also efficiently consumes computing resources (e.g., processing and memory resources) because the user may forego (or reduce reliance on) an ad hoc effort to organize the media items, thereby eliminating (or reducing) the expenditure of resources associated with this ad hoc effort.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 11 shows a second implementation of the narrative creation component.

FIG. 12 shows a third implementation of the narrative creation component.

FIG. 13 shows a representative template for use in the third implementation of the narrative creation component of FIG. 12.

Figure 1:
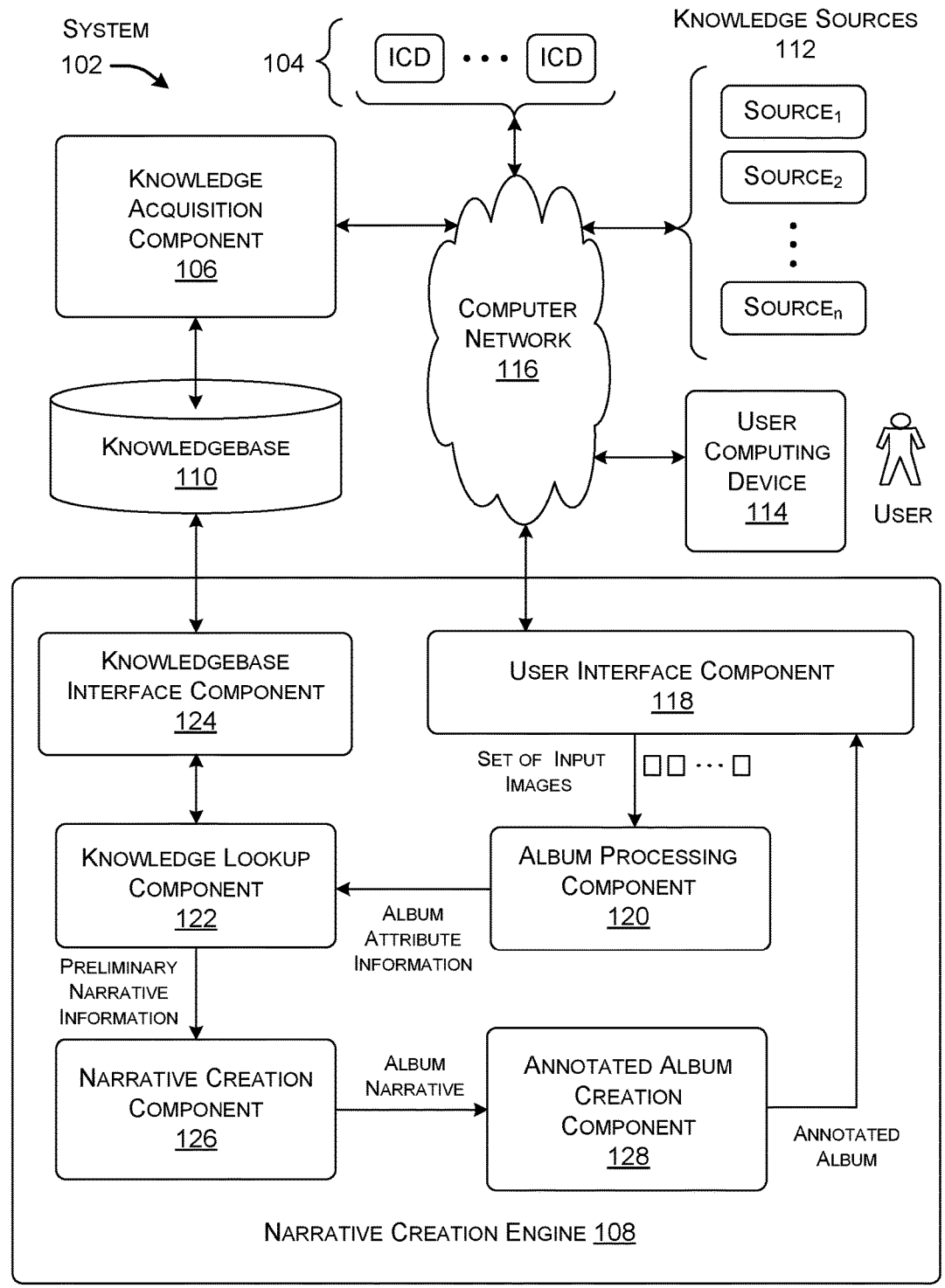
FIG. 1 shows a system for constructing a textual narrative based on a set of images, to ultimately produce an annotated album.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for generating a textual narrative based on a set of input images. Section B sets forth an illustrative method which explains the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or other logic hardware (e.g., FPGAs), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or other logic hardware (e.g., FPGAs), etc., or any combination thereof.

As to terminology, the phrase "configured to" encompasses various physical and tangible mechanisms for performing an identified operation. The mechanisms can be configured to perform an operation using, for instance, software running on computer equipment, or other logic hardware (e.g., FPGAs), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, or other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

FIG. 1 shows a system 102 for constructing a textual narrative based on a set of images. In one example, an end user captures the set of images in the course of visiting one or more locations for any purpose. For example, the end user may capture the images in the course of a vacation to the location(s). The system 102 automatically (or semi-automatically) constructs a narrative which describes the images in a cohesive manner.

The end user (or some other user(s) or entity(ies)) can capture the images using one or more image capture devices 104. For example, the image capture devices 104 can include any of a digital camera device, a smartphone, a wearable computing device, etc. In one case, each image corresponds to a static snapshot of a scene, taken at a particular time and place. An image capture device can generate an image using any format, e.g., as a JPEG image, etc.

In some cases, an image capture device can also store any type of supplemental information that is associated with a captured image. For example, an image capture device can store position information which reflects the location at which an image has been captured. In addition, or alternatively, an image capture device can store audio information. The audio information may capture sounds associated with the scene that has been captured, which occur at the time of capture. In addition, or alternatively, the audio information may capture the end user's contemporaneous commentary regarding the scene.

In other cases, one or more image capture devices 104 can produce other kinds of media items, such as video items. However, to simplify and facilitate explanation, this Detailed Description will henceforth assume that the image capture devices 104 capture static media items, such as digital photographs.

The system 102 encompasses two main components: a knowledge acquisition component 106 and a narrative creation engine 108. The knowledge acquisition component 106 generates a knowledgebase for storage in a data store 110. The knowledgebase provides a repository of information extracted from existing image-annotated narratives obtained from one or more knowledge sources 112. The narrative creation engine 108 receives one or more input images from the end user. The input images describe the end user's own travel experience with respect to one or more locations. The narrative creation engine 108 then leverages the information in the knowledgebase to construct an album narrative. The album narrative provides a cohesive account of the user's travel experience, associated with the set of input images.

From a broad perspective, the knowledge acquisition component 106 provides a way of cataloging the image-annotated narratives of others. The narrative creation engine 108 then provides a way of reusing the image-annotated narratives to describe the travel experience exhibited by the end user's own set of input images. By virtue of this capability, the system 102 provides a way by which the end user can quickly organize and describe a collection of images. This capability facilitates the user's later interaction with the images, and allows the user to quickly share the images with others. The system 102 also efficiently consumes computing resources (e.g., processing and memory resources) insofar as it allows a user to forgo (or reduce reliance on) an ad hoc effort to organize and describe a collection of images, and the resources consumed by such an ad hoc effort.

The end user may interact with the narrative creation engine 108 via a user computing device 114. The user computing device 114 may corresponding to any of a stationary computing workstation, a laptop computing device, a game console, a smartphone or any other type of handheld computing device, a set-top box, a wearable computing device, etc. In one case, the user computing device 114 may correspond to a separate device with respect to the image capture devices 104. In other case, the user computing device 114 may incorporate one or more of the image capture devices 104.

In one case, the user computing device 114 interacts with the narrative creation engine 108 via a computer network 116, such as a wide area network (e.g., the Internet), a local area network, one or more point-to-point links, etc., or any combination thereof. In another example, the user computing device 114 incorporates the narrative creation engine 108 as a component thereof, e.g., as an application that is locally stored by the user computing device 114. In another case, the narrative creation engine 108 provides functionality that is distributed between the user computing device 114 and one or more remote computing systems.

The end user can store the images provided by the image capture devices 104 in one or more storage devices within the system 102. For example, the end user can directly transfer the images from an image capture device to the user computing device 114, for storage thereat. Alternatively, or in addition, the end user can store the images provided by the image capture devices 104 at one or more remote storage locations (e.g., in a cloud storage system, not shown). The user computing device 114 may then interact with the images stored at the remote storage location(s).

This subsection (Subsection A.1) provides an overview of the knowledge acquisition component 106 and the narrative creation engine 108. Subsection A.2 provides additional illustrative detail regarding the knowledge acquisition component. Subsection A.3 provides additional illustrative detail regarding the narrative creation engine 108.

In a travel-rated context, the knowledge acquisition component 106 mines information from one or more primary knowledge sources that provide image-annotated narratives regarding travel to various locations. For instance, the knowledge acquisition component 106 can mine information from an online travel blog provided by Lonely Planet, of Melbourne, Australia. The knowledge acquisition component 106 operates by identifying source images in such a knowledge source, identifying attributes associated with those source images, and then identifying textual passages in the knowledge source which pertain to the source images. The knowledge acquisition component 106 stores information in the knowledgebase that links the identified attributes with the textual passages.

For example, consider a source content item that includes a source image that shows the Statue of Liberty, together with a description of a visit to New York City. The knowledge acquisition component 106 analyzes the source image to identify its various attributes (described below), and then identifies any textual passage within the source content item that pertains to the source image. The knowledge acquisition component 106 can then store information in the knowledgebase which links the identified attributes to the identified textual passages. In some cases, the textual passages describe the travel experiences of previous travelers in their interaction with the Statue of Liberty.

In addition, the knowledge acquisition component 106 can mine information provided by one or more secondary knowledge sources. Each such secondary knowledge source provides background information regarding topics presented in the above-described type of primary knowledge source. For instance, in addition to mining a primary knowledge regarding the Statue of Liberty from a travel blog, the knowledge acquisition component 106 can extract background information regarding the Statue of Liberty from an online encyclopedia, such as Wikipedia. The knowledge acquisition component 106 can also take metadata associated with a source image into account when retrieving relevant background information. For example, assume that the source image pertains to a celebration at Times Square in New York City on New Year's Eve. The time metadata associated with the source image is a highly relevant piece of information for use in interpreting what is happening in the source image.

Each knowledge source can correspond to a computing system that includes one or more server computing devices, one or more data stores, and other computing equipment (e.g., firewall mechanisms, routers, etc.).

In one implementation, the knowledge acquisition component 106 operates in an offline manner. For example, the knowledge acquisition component 106 can examine a set of predetermined knowledge sources on a periodic and/or event-driven basis. On each such instance, the knowledge acquisition component 106 can process new content that has been added to the knowledge sources since the knowledge sources were last visited.

With respect to the narrative creation engine 108, a user interface component 118 provides front-end functionality that receives a set of input images from the end user. As noted above, the end user captures these images while visiting one or more locations. Alternatively, or in addition, the end user may obtain at least some of the images from other sources, such as a public repository of digital photographs created by others. For instance, the end user may create a set of input images that describe his or trip to New York City that includes some digital photographs created by the end user, and other digital photographs obtained from other sources.

In any case, the set of input images collectively corresponds to an album. In some situations, the album includes groups of images taken at different respective locations, and/or groups of images otherwise pertaining to different subjects. For instance, the end user's album may include a first subset of images pertaining to the Statue of Liberty, and another collection of images pertaining to Central Park, both well-known sites within New York City. A group of images may contain redundant content. For example, the end user may take several pictures of the Statue of Liberty from slightly different angles.

An album processing component 120 determines attributes associated with each input image in the set of input images. The attributes collectively correspond to album attribute information. For instance, without limitation, the album attribute information can describe, for each image: the location associated with the image, the time-of-capture associated with the image (which reflects the time at which the image was captured), the objects (including landmarks) depicted in the image, the environmental conditions exhibited in the image, the relationships among any people (if any) depicted in the image, the emotions exhibited by the people in the image, and so on. For instance, with respect to an image of the Statue of Liberty, the album attribute information can include attributes which identify the captured landmark as the Statue of Liberty. Other attributes can describe the weather, the emotions of the people (if any) in the foreground of the image, the relationship(s) of those people, etc.

A knowledge lookup component 122 uses the album attribute information as a retrieval index to obtain preliminary narrative information from the knowledgebase (in the data store 110), via a knowledgebase interface component 124. For instance, in one implementation, the knowledge lookup component 122 calls on a search engine to retrieve zero, one or more records in the knowledgebase which have source attribute information which matches the album attribute information. For instance, assume that at least one image in the set of input images shows the Statue of Liberty on a cloudy day. Further assume that the album attribute information for this input image includes the attribute labels "Statue of Liberty" and "cloudy." The knowledge lookup component 122 can retrieve one or more records have matching attribute information (e.g., associated with the words "Statue of Liberty" and "cloudy"). The preliminary narrative information includes one or more textual passages associated with the matching attribute information. However, this manner of operation corresponds to just one implementation; as will be clarified below, what constitutes "preliminary narrative information" can vary with respect to different implementations.

The user interface component 118 and the knowledgebase interface component 124 can each correspond to any mechanism by which two systems may interact. For instance, each interface component (118, 124) can correspond to an application programming interface (API).

A narrative creation component 126 constructs a cohesive album narrative based on at least the preliminary narrative information. Subsection A.3 will describe three different techniques for performing this task. As a preview of that subsection, one technique uses a language generation component to generate the album narrative. The language generation component can uses a machine-learned statistical model (e.g., an n-gram model) to perform this task. The language generation component computes the probability of a next candidate word $w_z$ based on a set of words which precede the candidate word $w_z$ (if any). The language generation component also biases it calculations based on the preliminary narrative information.

An optional annotated album creation component 128 can combine the generated album narrative with the original set of input images, to produce an annotated album. For example, assume that the album narrative includes text portions that pertain to respective images in the set of input images. The annotated album creation component 128 can produce a travel blog that includes all or some of the images in the set of input images. The annotated album creation component 128 can present the text portions of the album narrative next to (or otherwise in close proximity to) the respective input images to which they pertain.

The user interface component 118 can return the annotated album to the end user, or otherwise make the annotated album accessible to the end user. The end user may then choose to archive the annotated album and/or to share it with one or more other people. For instance, the end user can post the annotated album to an online travel-related blog.

Overall, the knowledge acquisition component 106 can be implemented by a first computing system and the narrative creation engine 108 can be implemented by a second computing system. The first and second computing systems can correspond to two separate systems, administered by the same or different respective entities. Or the first and second computing systems can correspond to equipment associated with a single encompassing computing system. Each computing system can include one or more server computing devices and other computing equipment (e.g., firewall mechanisms, routers, etc.). Alternatively, each user computing device (e.g., user computing device 114) can implement any part of the functionality associated with the knowledge acquisition component 106 and/or the narrative creation engine 108.

Figure 2:
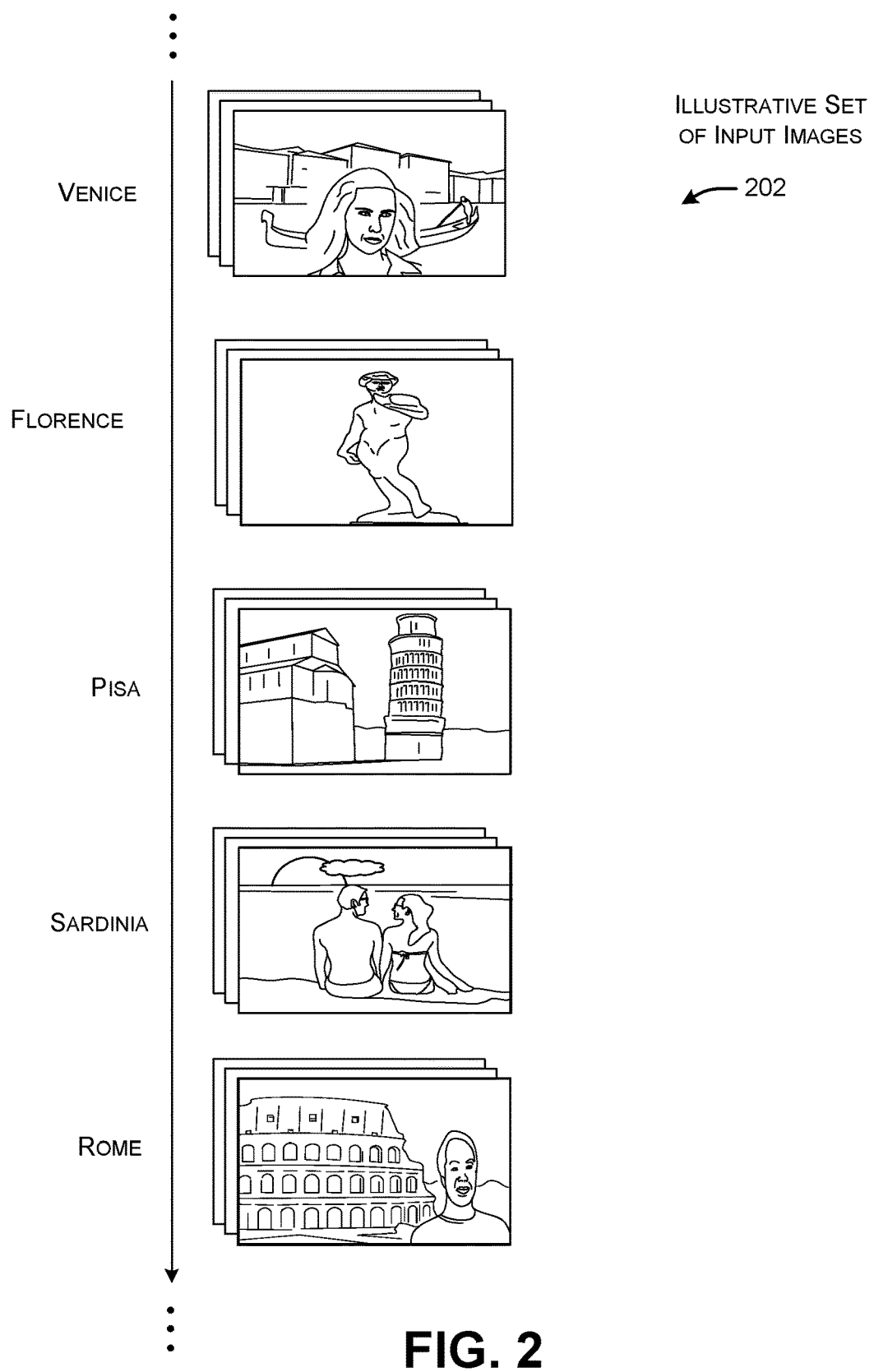
FIG. 2 shows an example of a set of input images fed to the system of FIG. 1.

FIG. 2 shows an example of a set of input images 202 that may be fed to the narrative creation engine 108 of FIG. 1. The set of input images capture the end user's trip to Italy. More specifically, presume that the end user has visited several regions (e.g., cities) in Italy, and has captured a subset of images at each region. For example, the set of input images 202 includes a first subset of images pertaining to Venice, a second set of input images pertaining to Florence, and so on. More generally, a set of input images can have any topical and geographical scope, and can encompass any span of capture times. For instance, in another case, the end user's set of input images can correspond to a single region and/or can otherwise pertain to a single theme. For instance, the end user's set of input images can solely focus on the Statue of Liberty in New York City.

Figure 3:
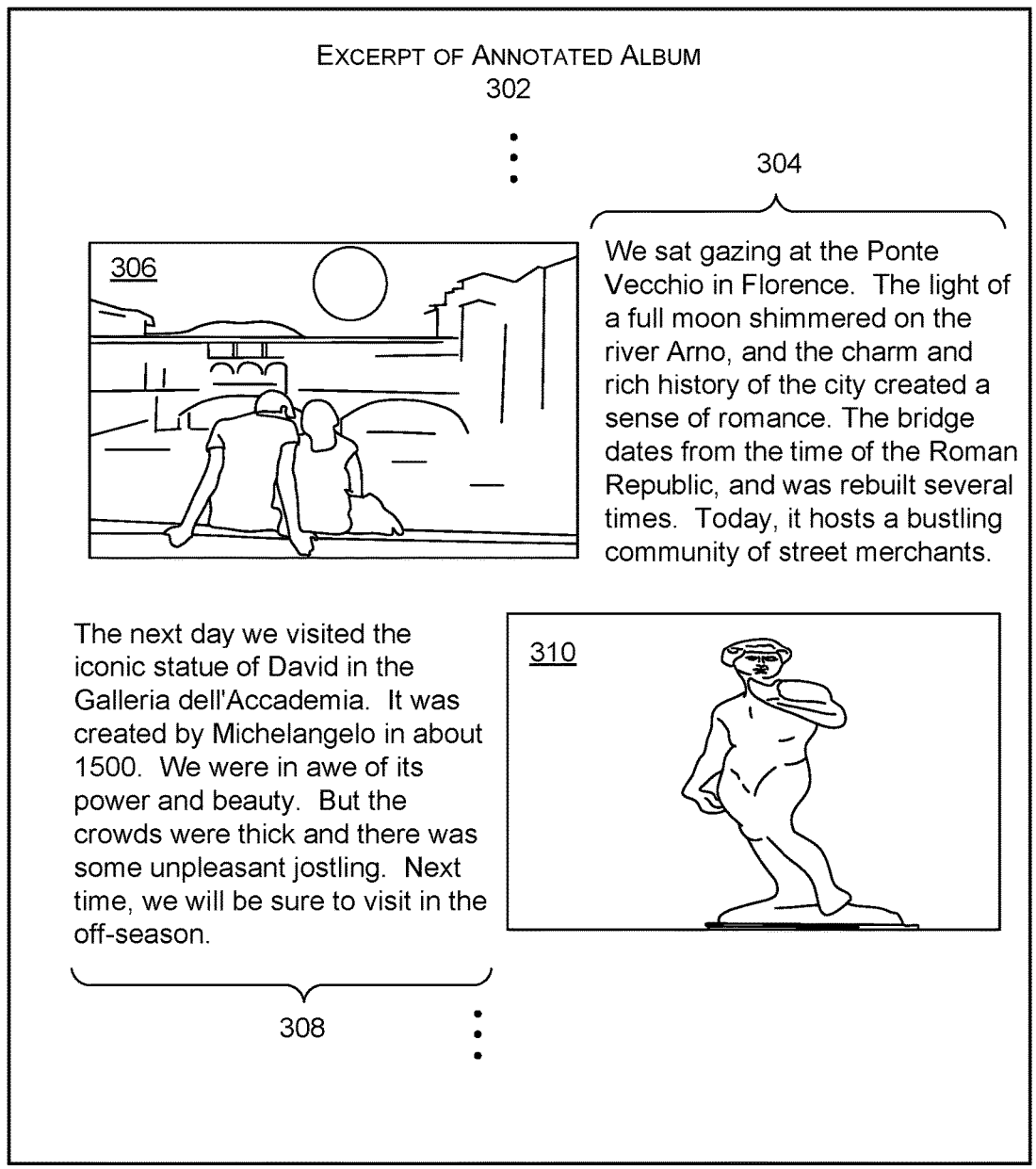
FIG. 3 shows an excerpt of an annotated album produced by the system of FIG. 1.

FIG. 3 shows an excerpt of an annotated album 302 produced by the system 102 of FIG. 1. The annotated album creation component 128 positions a first text portion 304 of the album narrative next to a first input image 306, and positions a second text portion 308 of the album narrative next to a second input image 310. Generally note that the album narrative ultimately reflects insight gained through other users' travel experiences at the associated site(s), here corresponding to the users' travel experiences in the Italian city of Florence. Hence, the album narrative may contain subjective reactions to the various sites, including emotional reactions. For instance, the text portion 304 accompanying the first input image 306 refers to the river Arno in poetic terms, and also makes reference to a sense of romance created by the overall scene. The album narrative can also interweave background information regarding the various sites having a more objective factual nature. For instance, the text portion 304 provides historical information regarding the Ponte Vecchio, corresponding to a well-known bridge depicted in the first input image 306.

In addition, the narrative creation engine 108 can produce the annotated album by mining narratives that are relevant to the input images, even though they do not pertain to the specific places captured in the input images. For example, the narrative creation engine 108 can extract preliminary narrative information regarding reactions of couples to the Ponte Fabricio in Rome or the Pont des Arts in Paris, etc., based on the premise that couples who view historical bridges in the Mediterranean while seated or standing close together may express similar sentiments, independent of their specific locations (to varying extents).

A.2. The Knowledge Acquisition Component

Figure 4:
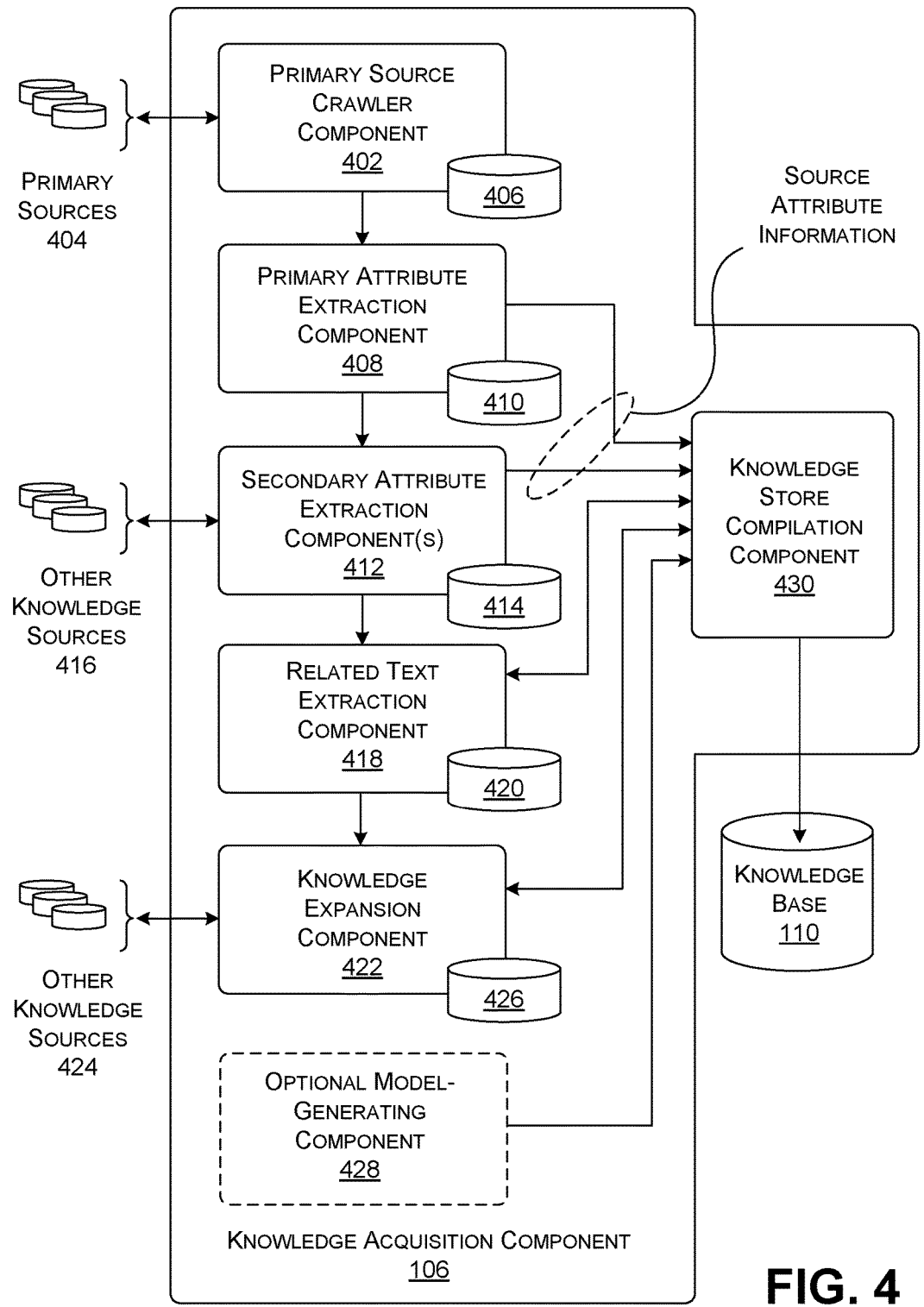
FIG. 4 shows an example of a knowledge acquisition component, which is a component of the system of FIG. 1.

FIG. 4 shows one implementation of the knowledge acquisition component 106. As described above, the knowledge acquisition component 106 mines network-accessible information to produce a knowledgebase. The knowledgebase maps attribute information to descriptions of travel-related experiences. A data store 110 stores the knowledgebase.

A primary source crawler component 402 examines one or more primary knowledge sources (provided in one or more data stores 404) on a periodic and/or event driven basis. The primary knowledge sources can include (for instance) travel blogs that provide image-annotated narratives of travel experiences. The primary source crawler component 402 can optionally store content that it retrieves from the primary knowledge sources in a data store 406. For example, upon identifying a new source content item in the primary knowledge sources, the primary source crawler component 402 stores that source content item the data store 406.

Figure 5:
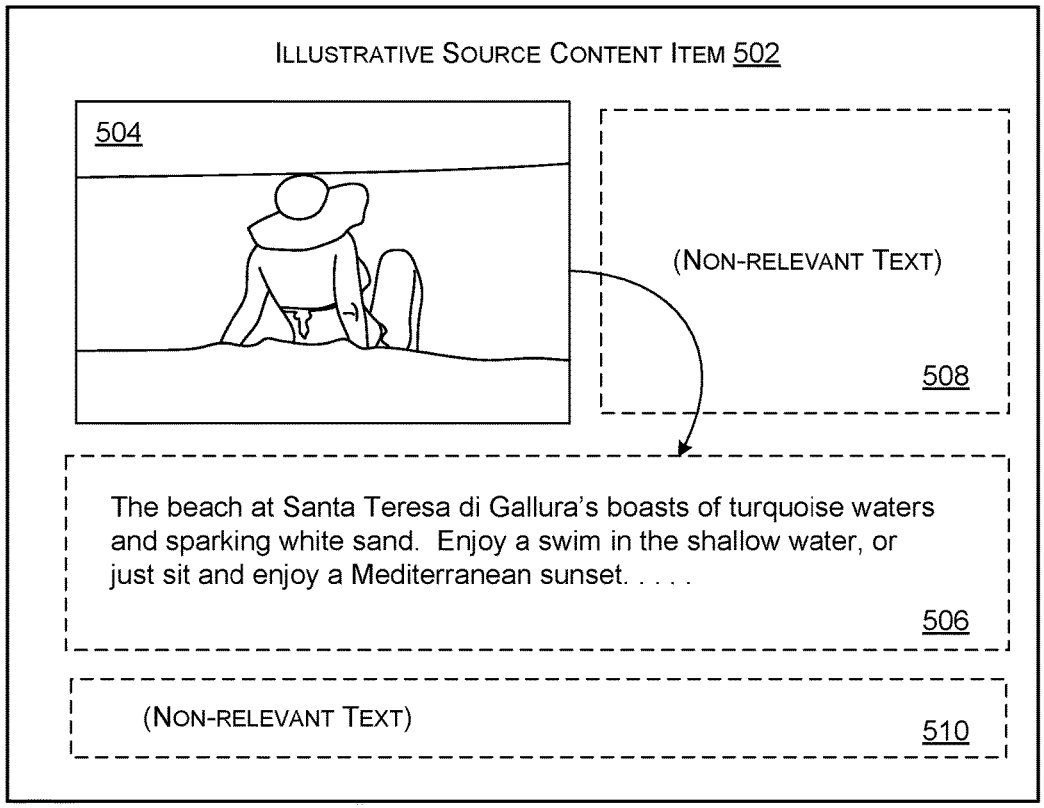
FIG. 5 shows a source content item that may be processed by the knowledge acquisition component of FIG. 4. The source content item includes a source image and accompanying text.

To facilitate explanation, the knowledge acquisition component 106 will be described below with reference to its processing of a single representative source content item that contains a single representative source image. For instance, advancing momentarily to FIG. 5, the representative single source content item 502 can include a description of Sardinia, Italy, which includes a single image 504. More generally, however, the knowledge acquisition component 106 can operate on a plurality of source content items at any given time. And any source content item can include any number of source images intermixed with textual passages.

A primary attribute extraction component 408 extracts a first set of attributes that are directly conveyed by each source content item (if any). The primary attribute extraction component 408 then stores the first set of attributes in a data store 410. For instance, the primary attribute extraction component 408 can extract position information and time information that is association with the source image, if any. That is, the position information and time information may exist as metadata that is associated with the source image. In some cases, an image capture device creates this metadata at the time that the source image is created. An image capture device can determine the position of the image capture device based on a GPS mechanism associated with the image capture device, and/or based on any other position determining mechanism(s).

In addition, the primary attribute extraction component 408 can use any type of feature-extraction component to extract raw image features associated with the source image. For example, the primary attribute extraction component 408 can use a convolutional neural network (CNN) to map the source image into a feature vector, sometimes referred to in the industry as an fc7 vector. Background information regarding the general topic of convolutional neural networks can be found in various sources, such as Krizhevsky, et al., "ImageNet Classification with Deep Convolutional Neural Networks," in Proceedings of the 25th International Conference on Neural Information Processing Systems (NIPS), December 2012, pp. 1097-1105.

A secondary attribute extraction component 412 extracts a second set of attributes from a source image. The second set of attributes may correspond to higher-level descriptions of a source image compared to the first set of attributes. The secondary attribute extraction component 412 then stores the second set of attributes in a data store 414. For instance, the secondary attribute extraction component 412 can include one or more machine-learned statistical models which map the image features (provided by the primary attribute extraction component 408) into one or more classification results.

For example, the secondary attribute extraction component 412 can use a Multiple Instance Learning (MIL) classifier that, in turn, is made up of a plurality of binary classifiers. Each binary classifier determines a probability that the source image maps to a particular label. That label can correspond to any aspect that may or may not be present in the source image, including particular objects (and landmarks), environmental conditions, emotions, relationship types, etc. Each such label constitutes a separate identified attribute.

More specifically, the MIL classifier can break an input source image i into a plurality of overlapping regions $r_i$, e.g., each region j composed of a 12×12 block of picture elements (e.g., pixels). The MIL classifier can then determine the probability $p_i^w$ that the image i is associated with a particular label w using the following illustrative formula:

$$p_i^w = 1 - \prod_{j \in r_i} (1 - \sigma(f_{ij} \cdot v_w)). \qquad (1)$$

The term $f_{ij}$ refers to a feature vector (e.g., a fc7 feature vector) associated with a region j in $r_i$. The term $v_w$ refers to machine-learned classifier weights (produced by an offline training system). Collectively, the term $\sigma(f_{ij} \cdot v_w)$ refers to the probability that the label w occurs in the region j of image i, where $\sigma(x)$ is the sigmoid function.

When the MIL classifier predicts that the image i contains the label w with high probability, the source image is likely to depict whatever concept is associated with the label w, such as a particular object (e.g., a landmark), environmental condition (e.g., "cloudy," "sunny," etc.), emotion ("happy," "surprised," "amorous," etc.), relationship type ("romantic couple," "familial link," etc.), and so on. For instance, with respect to the image 504 of FIG. 5, the MIL classifier could indicate that the image 504 is associated with the following labels: "woman," "sitting," "sand," "beach," etc. In some cases, a label may map to a discrete object in the source image, such as "woman." In other cases, a label may have a more general association with the source image, as in the hypothetical label "peaceful"; that is, many elements of the scene may contribute to its ability to convey a sense of peace.

Figure 8:
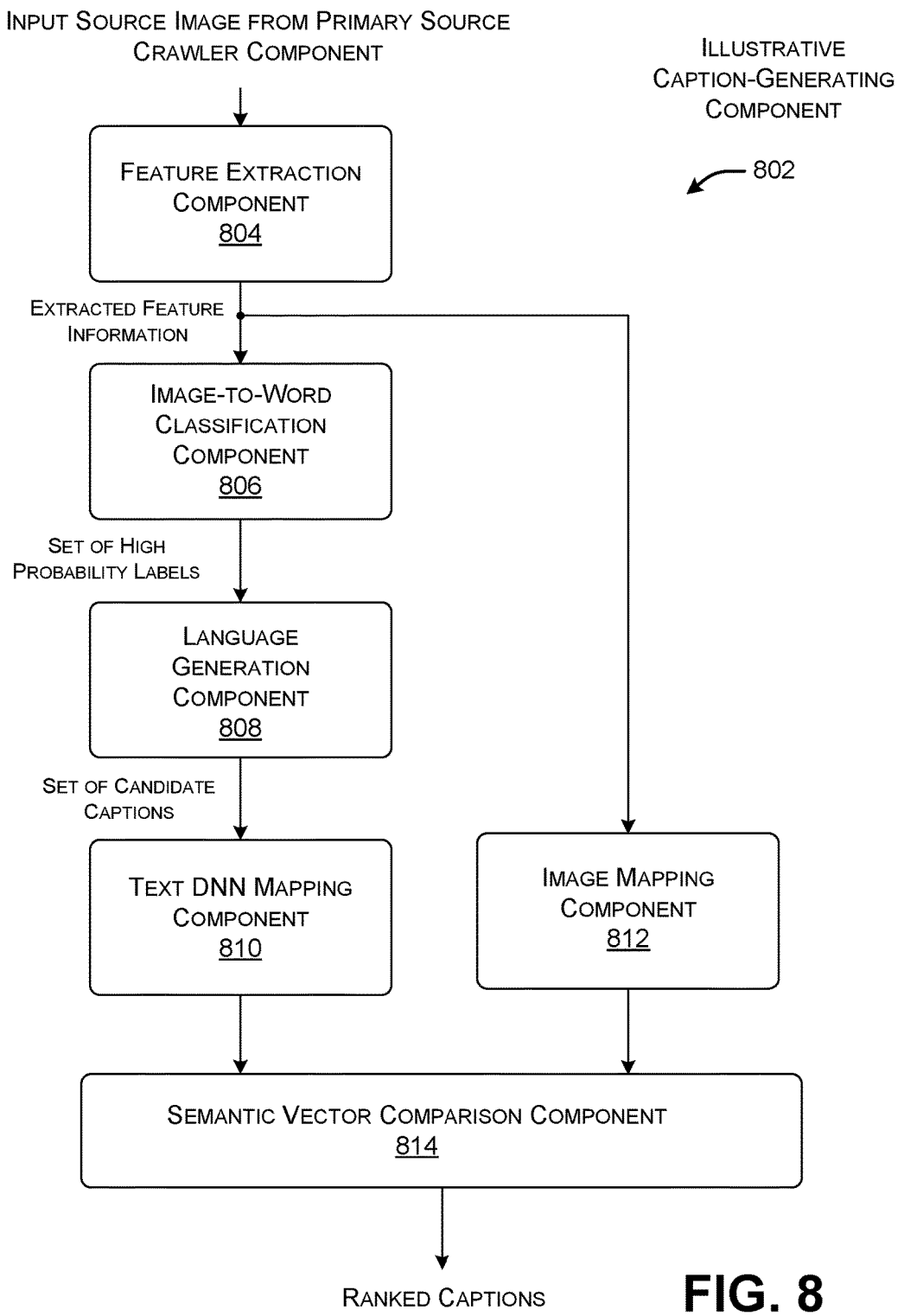
FIG. 8 shows one implementation of a caption-generating component, which is a sub-component of the knowledge acquisition component of FIG. 4.

In addition, or alternatively, the secondary attribute extraction component 412 can include a caption-generating component that generates one or more candidate captions for the source image. The caption-generating component can use a machine-learned language model to perform this task. FIG. 8 (described below) provides one example of a caption-generating component that can be used to generate captions. Each candidate caption may constitute an attribute.

In addition, or alternatively, the secondary attribute extraction component 412 can perform a search over a corpus of target images, e.g., provided in one or more data stores 416. That is, the secondary attribute extraction component 412 can formulate a search query that includes features associated with the source image. The features can correspond to raw image features and/or higher-level attributes associated with the source content item. A search engine can return zero, one or more target images having features which match the search query. The second attribute extraction component 412 can then glean whatever knowledge is imparted by the matching target image(s). For instance, presume that a matching target image is already associated with one or more labels. The secondary attribute extraction component 412 can associate those labels with the source image. For instance, the secondary attribute extraction component 412 can perform a search based on the source image 504 of FIG. 5 to find a target image that pertains to the island of Sardinia, Italy; the secondary extraction component 412 can thereafter tag the source image 504 as also pertaining to Sardinia, Italy.

The above-described implementations of the secondary attribute extraction component 412 are cited by way of example, not limitation; other implementations can use yet other strategies to extract attributes from each source image. Collectively, all or some of the attributes that are provided by the primary attribute extraction component 408 and the secondary attribute extraction component 412 are referred to herein as source attribute information.

A related text extraction component 418 identifies a text portion (if any) within a source content item that relates to a source image. For instance, with respect to FIG. 5, the related text extraction component 418 can determine that a textual passage 506 pertains to the source image 504, within a body of text potentially including non-relevant textual passages (508, 510, etc.). The related text extraction component 420 can store each such identified passage in a data store 420.

The related text extraction component 418 can use one or more techniques to identify a related passage. For example, the related text extraction component 418 can use the source attribute information as a search term to find a portion of the text that contains one or more of those attributes associated with the source attribution information. For instance, assume that one source attribute is "beach," and another is "sand." The related text extraction component 418 can perform a search within the body of text to identify the textual passage 506 because that portion contains the words "beach" and "sand." More specifically, the related text extraction component 418 can select an n-word sequence, sentence, paragraph, or other unit of text that contains these words.

Alternatively, or in addition, the related text extraction component 418 can use a machine-learned statistical model to find those portions of the source content item that are related to the source image. For example, the related text extraction component 418 can use a deep neural network (DNN) to map a representation of the source attribute information to a first vector in an abstract semantic space. The related text extraction component 418 can then use the DNN to map each sentence (or other unit of text) in the body of the source content item into another vector in the same semantic space. The related text extraction component 418 can thereafter choose those textual passages having vectors that are sufficiently close to the first vector, with respect to any metric of similarity (e.g., using a cosine similarity vector) and with respect to any environment-specific threshold value of similarity.

A knowledge expansion component 422 optionally retrieves additional background information regarding the source image from one or more secondary knowledge sources provided in one or more data stores 424. The knowledge expansion component 422 stores the additional background information in a data store 426. The additional background information constitutes supplemental textual passages that relate to the subject matter of the source image.

For instance, the knowledge expansion component 422 can generate a search query that includes any set of attributes that have been identified. Alternatively, or in addition, the knowledge expansion component 422 can construct a search query that includes any information extracted from the textual passages identified by the related text extraction component 422. A search engine can then retrieve zero, one or more content items that match the query, with respect to any measure of similarity. For instance, assume that one attribute associated with the source image 504 of FIG. 5 corresponds to the label "Sardinia." The search engine can retrieve background information from an online encyclopedia regarding the island of Sardinia. The background information supplements the textual passage 506 contained in the source content item 502 itself The knowledge expansion component 422 can also take one or more other types of source attributes into account when retrieving background information. For example, assume that a source image depicts a celebration in Times Square in New York City on New Year's Eve, where the time that the source image was taken is reflected in the metadata associated with the source image and/or by metadata manually specified by a user. The knowledge expansion component 422 can extract background information that specifically pertains to New Year's Eve celebration at Times Square. The knowledge expansion component 422 can also optionally extract background information regarding celebrations at other well-known New Year's gathering places (such as the Copacabana Beach in Rio de Janeiro, the Sydney Harbor Bridge in Sydney Australia, and so on), and suitably weight this background information to reflect that it pertains to locations other than Times Square. Generally, the time metadata in this case constitutes a key piece of evidence for use in interpreting what is happening in the scene. In the Times Square example, the time metadata is relevant because it pertains to a particular time of the year. Alternatively, or in addition, the time of day (e.g., hour of the day) is a relevant piece of information. Alternatively, or in addition, the general season associated with the time metadata is a relevant piece of information, etc.

An optional model-generating component 428 generates one or more machine-learned statistical models. For instance, the model-generating component 428 can generate a single machine-learned statistical model that maps any set of attributes to a text phrase. The text phrase corresponds to an appropriate description of whatever image is associated with the input attributes. In one implementation, for instance, the model-generating component 428 can correspond to a recursive neural network (RNN), such as an encoder-decoder type of RNN. The encoder phase of the RNN maps an input set of input attributes to a vector in a semantic space, while the decoder phase of the RNN maps the vector to an output phrase. Background information on the general topic of encoder-decoder type neural networks can be found in, for instance, Cho et al., "On the Properties of Neural Machine Translation: Encoder-Decoder," arXiv: 1409.1259v2 [cs.CL], October 2014, 9 pages.

In another case, the model-generating component 428 can generate plural different machine-learned statistical models (e.g., plural RNN models) for different respective input situations. For example, the model-generating component 428 can generate different RNN models for different respective types of locations and/or different subject matter domains, etc.

A knowledge store compilation component 430 compiles the output results of at least some of the above-described components into information for storage in the knowledgebase. For instance, for each image, the knowledge store compilation component 430 can map the identified attributes (collectively constituting source attribute information) to the representative text associated with the attributes. That is, the primary attribute extraction component 408 and the secondary attribute extraction component 412 supply the source attribute information, while the related text extraction component 418 and the knowledge expansion component 422 supply the representative text. The knowledge store compilation component 430 can also store any statistical model(s) generated by the optional model-generating component 428. Each such model may correspond to a set of weights learned in an offline machine-training process.

Figure 6:
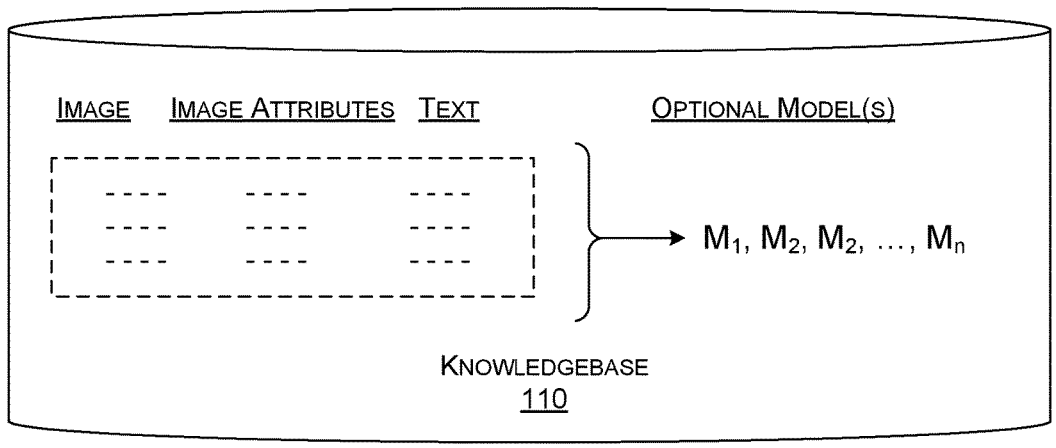
FIG. 6 shows a knowledgebase produced by the knowledge acquisition component of FIG. 4.

FIG. 6 provides a high-level representation of the knowledgebase produced by the knowledge store compilation component 430, provided in the data store 110. The knowledgebase may have any data structure. In one case, the knowledgebase includes a plurality of records. Each record pertains to a particular source image. The record lists the source attribute information associated with the source image and any textual passages associated with the source attribute information. In another case, the knowledgebase consolidates related records into a single record. For example, if plural images have the same (or closely related) attribute information, then the knowledge store compilation component 430 can store a single record for this group of source images. The single record accumulates all of the passages associated with these source images.

Figure 7:
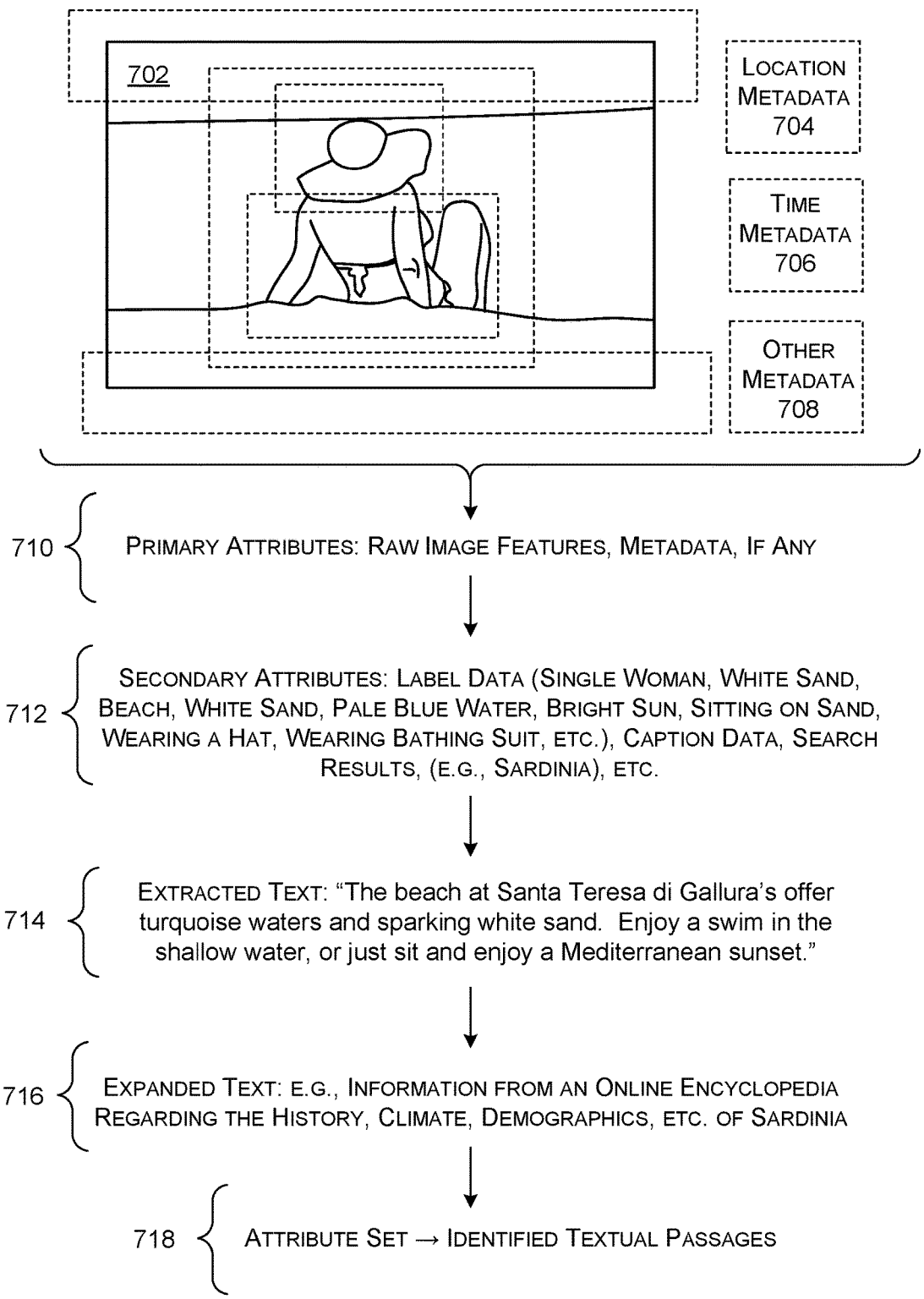
FIG. 7 shows an example of one manner by which the knowledge acquisition component (of FIG. 4) can extract source attribute information from a source image.

FIG. 7 shows an example of one manner by which the knowledge acquisition component 106 can extract source attribute information from a source image 702. The source image 702 can optionally include any of location metadata 704 (describing the location at which the image 702 was captured by the image capture device), time metadata 706 (describing the time at which the image 702 was captured by an image capture device), and/or any other metadata 708. The primary source crawler component 402 extracts the source image 702 from a corresponding source content item, provided by a primary knowledge source.

The primary attribute extraction component 408 extracts primary attributes 710 from the source image 702, including raw image features, the metadata (704, 706, 708), if any, etc. The secondary attribute extraction component 412 can provide secondary attributes 712 such as label information, candidate captions, etc. The related text extraction component 418 can extract a related passage 714 from the source content item, which pertains to the identified source attribute information. The knowledge expansion component 422 can provide at least one supplemental background passage 716 obtained from one or more secondary knowledge sources. The knowledge store compilation component 430 can store any of the above-described collected information in the knowledgebase, to provide a record 718. Although not shown, the model-generating component 428 can update one or more machine-learned statistical models based above-described information, and can also store those updated statistical models in the knowledgebase.

FIG. 8 shows one implementation of a caption-generating component 802. In one implementation, the knowledge acquisition component 106 of FIG. 4 incorporates the functionality of the caption-generating component 802. In another implementation, the knowledge acquisition component 106 includes an interface component (e.g., corresponding to an API) for interacting with another computing system which implements the caption-generating component 802.

To begin with, a feature extraction component 804 can include any mechanism for extracting a set of raw image features that characterize a source image. For instance, the feature extraction component 804 can correspond to the above-described convolutional neural network (CNN) that provides an fc7 output vector.

The image-to-word classification component 806 determines a set V of labels (e.g., words) that have a high likelihood of being associated with the source image. For instance, the image-to-word classification component 806 can correspond to the kind of Multiple Instance Learning (MIL) classifier described above, and as described in Equation (1). Generally, the image-to-word classification component 806 determines the probability that the input feature vector maps to each candidate word $e_i$ in a possible vocabulary $\varepsilon$ of candidate words. The image-to-word classification component 806 defines the set V of high-probability words (selected from the complete vocabulary $\varepsilon$ of candidate words) as those words having high probabilities, as assessed based on an environment-specific threshold value.

A language generation component 808 determines a set of candidate captions associated with the source image. In one implementation, the language generation component 808 uses a Maximum Entropy (ME) Language Model (LM) that is conditioned on a set $V_z$ of words identified by the image-to-word classification component 806 that have yet to be mentioned in the caption. More specifically, the language generation component 808 generates the words of a candidate caption in successive word-by-word fashion. For each prediction, the language generation component 808 computes the probability of a next word $w_z$ using the following equation:

$$Pr(w_z = w_z \mid w_{z-1}, \ldots, w_1, \langle s \rangle, V_{z-1}) = \qquad (2)$$

$$\frac{\exp\left[\sum_{k=1}^{K} \lambda_k f_k(w_z, w_{z-1}, \ldots, w_1, \langle s \rangle, V_{z-1})\right]}{\sum_{e \in (\varepsilon \cup \langle /s \rangle)} \exp\left[\sum_{k=1}^{K} \lambda_k f_k(e, w_{z-1}, \ldots, w_1, \langle s \rangle, V_{z-1})\right]}.$$

In this equation, the symbols <s> and </s> respectively denote the start of the candidate caption and the end of the candidate caption being generated. The word $w_z$ is selected from any word in the initial vocabulary $\varepsilon$ of words and the end-of-caption symbol </s>. The words which precede the word $w_z$ (if any) are respectively denoted by $w_{z-1}, \ldots, w_1$. The terms $f_k(\ )$ and $\lambda_k$ denotes the k-th maximum entropy feature and its weight, respectively. Different implementations can use different sets of maximum entropy features. In one implementation, the set of maximum entropy features can include a first feature which indicates whether the candidate word $w_z$ under consideration is an element of the attribute set $V_{z-1}$, meaning it is a word that has a high probability of occurrence and it has not yet been used. A second feature provides the probability score of the word $w_z$ computed by the image-to-word classification component 806, and so on.

The language generation component 808 computes a plurality of candidate captions by building a branching tree of multi-word string possibilities, one word at a time. The language generation component 808 can select a subset C of these candidate captions that have the highest probability scores.

The remaining three components (810, 812, 814) collectively test the fitness of each candidate caption. In one technique, for instance, a deep neural network (DNN) text mapping component 810 maps each candidate caption into a first vector $y_X$ in an abstract semantic space. Similarly, an image mapping component 812 maps the raw source image into a second vector $y_Y$ in the same abstract semantic space. A semantic vector comparison component 814 determines the extent to which the candidate caption is a fit description of the source image based on how close the first vector $y_X$ is to the second vector $y_Y$ within the semantic space. The semantic vector comparison component 814 can gauge similarity using any metric, such as cosine similarity, e.g., as expressed in the following equation:

$$S(X, Y) = \text{cosine}(y_X, y_Y) = \frac{y_X \cdot y_Y}{\|y_X\| \|y_Y\|}. \quad (3)$$

That is, the value S(X, Y), referred to herein as a score value or similarity relation, reflects the similarity or closeness between the candidate caption X and the source image Y. The semantic vector comparison component 814 can select one or more captions having the strongest score values.

The DNN text mapping component 810 can be implemented as a convolutional neural network (CNN). Background information regarding CNNs for transforming strings into vectors can be found, for instance, in Shen, et al., "A Latent Semantic Model with Convolutional-Pooling Structure for Information Retrieval," in Proceedings of the 23rd ACM International Conference on Conference on Information and Knowledge Management, November 2014, pp. 101-110. The image mapping component can correspond to a feed-forward neural network having g layers.

In another implementation, another machine-learned statistical model (not shown) ranks the candidate captions based on a set of features, including, but not limited to, the score values generated by the semantic vector comparison component 814.

A.3. The Narrative Creation Engine

Figure 9:
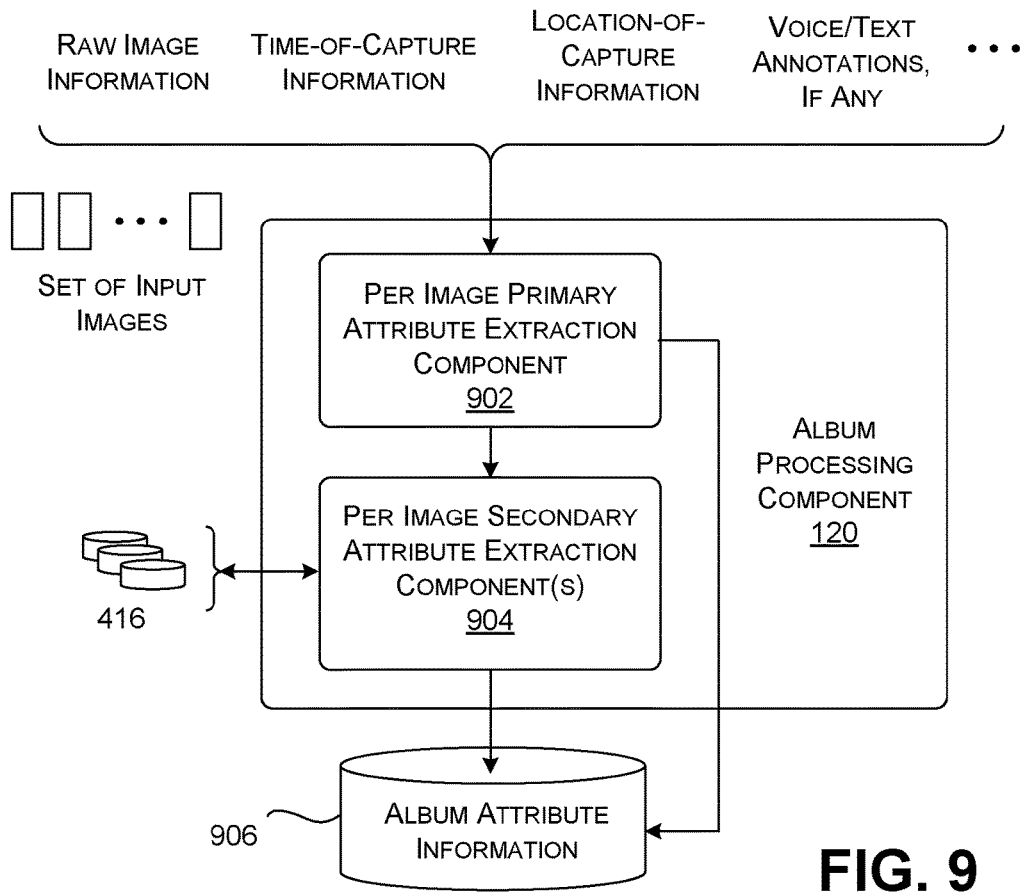
FIG. 9 shows one implementation of an album processing component, which is another component of the system of FIG. 1.

FIG. 9 shows one implementation of the album processing component 120. The album processing component 120 receives a set of input images, such as the set of input images 202 depicted in FIG. 2. The set of input images can capture scenes associated with one or more locations. Each input image can optionally be accompanied by time information (describing its time of capture), location information (describing the position at which it was captured), and/or other metadata. In addition, or alternatively, each input image can be accompanied by supplemental audio information and/or text information. The end user may capture and/or manually create the supplemental information at the time of capture, e.g., for the purposes of describing the scene that is being captured.

A primary attribute extraction component 902 and a secondary attribute extraction component 904 perform the same functions as the same-named components of the knowledge acquisition component 106. That is, the primary attribute extraction component 902 can extract raw image features and metadata from each input image in the set of input images. These extracted items constitute primary attributes. The secondary attribute extraction component 904 can provide further analysis to extract additional (secondary) attributes. For example, the secondary attribute extraction component 904 can use the kind of Multiple Instance Learning (MIL) classifier described above (in Equation (1)) to associate a set of labels with each input image. These labels have a high probability of describing aspects of the input image. In addition, or alternatively, the secondary attribute extraction component 904 can use a caption-generation component to associate one or more captions with each input image. In addition, or alternatively, the secondary attribute extraction component 904 can perform a search operation to help identify a location and/or landmark and/or any other aspect associated with each input image, and so on. The album processing component 120 stores attributes described above in a data store 906. Collectively, the attributes correspond to album attribute information according to the terminology used herein.

Assume that one or more of the input images depicts people. In some cases, the secondary attribute extraction component 904 can automatically determine the relationship of the people in the input images. For example, in one approach, the secondary attribute extraction component 904 can perform face recognition to determine the identities of the individuals depicted in the input images. The secondary attribute extraction component 904 can then consult a predetermined social graph or the like which reveals the nature of the relationship among the people depicted in the input images.

In another approach, the secondary attribute extraction component 904 can use the content of the input images to deduce the relationships of the people in the input images. For example, an input image that shows two people amorously kissing and embracing each other is likely depicting two people who have a romantic relationship, rather than, say, a familial relationship. An input image that depicts an adult holding the hand of a child is likely depicting a parent-child relationship, and so on.

In a third approach, the secondary attribute extraction component 904 can rely on supplemental information associated with the input images (if any) to determine the nature of the relationships in an input image. For example, in the course of taking a photograph of two friends, the picture-taker may provide a verbal cue that indicates that the friends have a romantic relationship, etc.

In a fourth approach, the secondary attribute extraction component 904 can explicitly ask the end user to specify the relationships. For instance, the secondary attribute extraction component 904 can ask the end user to specify the relationships when it cannot determine the relationships with a sufficient degree of confidence, with respect to any environment-specific threshold of confidence. In any event, the narrative creation engine 108 works best when it correctly identifies the relationships in the images. For instance, the narrative creation engine 108 will produce a poor user experience if it incorrectly describes the travel experience of a brother and sister as a romantic sojourn.

The knowledge lookup component 122 (shown in FIG. 1) retrieves preliminary narrative information from the knowledgebase based on the album attribute information identified by the album processing component 120. The knowledge lookup component 122 operates in different ways in different respective implementations.

In a first implementation, the knowledge lookup component 122 submits the album attribute information for each input image as a search query to a search engine. The search engine finds zero, one or more records in the knowledgebase that have matching instances of source attribute information. The search engine then retrieves the textual passages associated with the matching records. Those textual passages collectively constitute the preliminary text information.

To provide a specific example, assume that the input image contains a picture of two people on a bridge in Italy (e.g., as is the case with the input image 306 of FIG. 3). The album processing component 120 can generate album attribute information that includes the labels "bridge," "Florence," and "romantic couple." The knowledge lookup component 122 can find one or more records that are also associated with the attributes "bridge," "Florence," and "romantic couple." It then retrieves whatever textual passages are associated with those records. Those textual passages may describe previous travel experiences of romantic couples on a bridge in Florence, Italy. The textual passages may also contain background information regarding the Ponte Vecchio.

The knowledge lookup component 122 can also take time metadata into account when performing a search. For example, assume that the input images are tagged with timestamps which indicate that they were taken during a holiday that is celebrated in a particular country, such as the Festival of Lights (Diwali) in India. In that case, the time metadata associated with the input images constitute a key piece of evidence in interpreting what is happening in the scenes depicted by the input images.

The search engine can define what constitutes a match in different ways. In one case, the search engine can identify records having instances of source attribute information that include all of the attributes specified in the album attribute information. In another case, the search engine can perform a fuzzy search by identifying records that have instances of source attribute information that include some, but not all, of the attributes specified in the album attribute information.

In yet another knowledge lookup component 122 can use a deep neural network (DNN) to map the album attribute information to an album vector in semantic space. Presume that, as an offline process, the knowledge acquisition component 106 has also mapped the source attribute information (and/or corresponding textual passages) associated with each of its records to a vector in the same semantic space. The knowledge lookup component 122 can then find zero, one or more records having vectors that are sufficiently similar to the album vector, with respect to any metric of similarity (e.g., cosine similarity), and with respect to any environment-specific threshold value which defines a match. In this case, the knowledge lookup component may find that romantic travel experiences associated with other bridges in the world have a bearing on the particular input image under consideration, which pertains to a particular bridge in Florence, Italy.

More generally, by performing a fuzzy search (in whatever manner accomplished), the knowledge lookup component 122 can find the preliminary narrative information that is most relevant to the set of input images. In some case, the fuzzy search will find album attribute information that is a very close match to the album attribute information, e.g., as when travel blogs have been identified that describe lovers viewing the Ponte Vecchio in Florence, Italy. In other cases, the fuzzy search will locate, at best, narratives of couples viewing other bridges throughout the world.

A fuzzy search (or any broadened search) is particularly useful in capturing expressions of emotions that may be pertinent to one or more input images. For example, again assume that the input image corresponds to the image 306 shown in FIG. 3, which shows lovers viewing the Ponte Vecchio in Florence, Italy. The knowledge lookup component 122 can perform a relatively narrow search to find information that is relevant to the specific bridge shown in the picture. But to find an expression of appropriate emotions, the knowledge lookup component 122 can perform a broader search to find accounts of couples viewing historical bridges at night, while seated close together. The knowledge lookup component 122 can assign a relatively high weight to accounts that pertain to Florence, and, to a somewhat lesser extent, Italy, but it will not exclude accounts associated with other parts of the Mediterranean or other parts of the world. This is because the emotional dimension of a scene may be agnostic with respect to location, to varying extents.

The knowledge lookup component 122 can select the breadth of its search (and its assessment of relevance) based on one or more rules and/or based on knowledge gained by a machine-learned statistical model. For example, the machine-learned statistical model may learn a pattern that indicates that it is appropriate to cast a wider search net when collecting information regarding the emotional dimension of an input scene.

In a second implementation, the knowledgebase includes a recursive neural network (RNN) model or other type of machine-learned statistical model. The knowledge lookup component 122 can use the RNN to translate album attribute information associated with each input image into a synthetic textual passage. A training system trains the RNN model based on actual textual passages in travel blogs or the like. This means that each synthetic textual passage that is generated reflects the knowledge imparted by actual textural passages, but each synthetic textual passage need not correspond to a literal duplication of a counterpart actual textural passage. In the second implementation, the synthetic textual passages that are generated collectively constitute the preliminary narrative information.

In a third implementation, the knowledge lookup component 122 performs the operations associated with both the first implementation and the second implementation. That is, the knowledge lookup component 122 can use the album attribute information to retrieve actual textual passages in the knowledgebase; it can also use a machine-learned statistical model to generate synthetic textual passages.

In any of the above cases, the preliminary narrative information can also include any of the textual album narrative information that is generated by the album processing component 120. For instance, the preliminary narrative information can also include one or more labels and/or captions generated by the album processing component 120.

Figure 10:
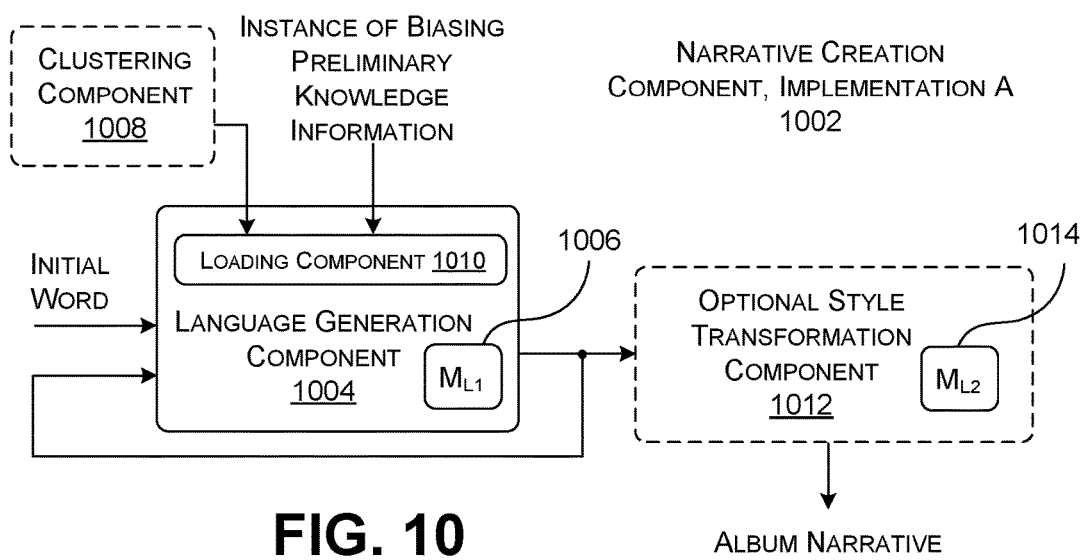
FIG. 10 shows a first implementation of a narrative creation component, which is another component of the system of FIG. 1.

FIG. 10 shows a first implementation of the narrative creation component 126 of FIG. 1, labeled in FIG. 10 as a narrative creation component 1002. This implementation includes a language generation component 1004 that generates the words of the album narrative. The language generation component 1004 can perform this task using a statistical language model 1006, such as an n-gram machine-learned statistical model.

In one implementation, the language generation component 1004 processes each input image in the set of input images in the order in which the images where taken. That is, the language generation component 1004 can generate a passage $p_1$ pertaining to a first input image $i_1$ that was captured at time $t_1$, generate a passage $p_2$ pertaining to a second input image $i_2$ that was captured at time $t_2$, generate a passage $p_3$ pertaining to a third input image $i_3$ captured at time $t_3$, and so on.

In another case, an optional clustering component 1008 performs the preliminary operation of forming clusters of related images, where relatedness is defined in terms of capture time and/or subject matter and/or any other dimension of content. The clustering component 1008 can perform the above-described clustering operation by using a DNN to map each input image (and/or the album attribute information and/or preliminary narrative information associated therewith) to a vector in a semantic space. The clustering component 1008 can then form groups of related input images by forming clusters of similar vectors in the semantic space.

The narrative creation component 1002 can thereafter process the set of input images on the level of granularity of clusters. For example, the clustering component 1008 can choose representative input images from the clusters. The narrative creation component 1002 can thereafter selectively process the preliminary narrative information associated with those representative input images, rather than the complete set of input images.

In another implementation, the clustering component 1008 can form a digest of preliminary narrative information for each cluster, representing the textual passages associated with the cluster as a whole. The narrative creation component 1002 can thereafter process those digests.

In either of above the above implementations, each cluster generally maps to a time span in which its images were captured. The narrative creation component 1002 can process the clusters based on the order defined by their respective time spans. For instance, with respect to the example of FIG. 2, the narrative creation component 1002 can process the images for Venice prior to the images of Florence.

Consider the operation of the language generation component 1004 with respect to a representative input image (or a cluster of related source images). The language generation component 1004 begins by using a loading component 1010 to load preliminary narrative information that pertains to the input image(s). That preliminary narrative information may reflect actual textual passages extracted from travel blogs or the like. Alternatively, or in addition, the preliminary narrative information may reflect synthetic textual passages generated by an RNN model or some other machine-learned statistical model.

The language generation component 1004 then commences to generate the words of a textual passage, where that passage can include one or more sentences, and is demarcated by a starting symbol <p> and an ending symbol </p>. The language generation component 1004 performs this task by using the statistical language model 1006 to generate each word $w_z$ of the passage in succession.

In one implementation, the statistical language model 1006 can use Equation (2) to generate the words, but in a different context than is presented above. That is, the statistical language model 1006 computes the probability of a candidate word $w_z$ depending on the n words which precede it in the text (if any). The statistical language model 1006 also computes the probability based on some or all of the preliminary narrative information associated with the input image(s) under consideration. In other words, whereas Equation (2) conditions its output results based on the labels generated by the image-to-word classification component 806, the statistical language model 1006 conditions its output results based on the full wealth of descriptive content contained in the preliminary narrative information. That preliminary narrative information may reflect actual passages created by other travelers and/or synthetic passages produced by an RNN model, etc.

Alternatively, or in addition, the language generation component 1004 can determine the probability of the candidate word $w_z$ based on the output of the statistical language model 1006 in conjunction with one or more other measures. For example, a statistical topic model (not shown) can determine a topic score which measures an extent to which the added candidate word $w_z$ is thematically related to the preliminary narrative information, and/or the extent to which an n-gram which ends in the candidate word $w_z$ is thematically related to the preliminary narrative information. The language generation component 1004 can take this topic score into account, along with a language model score provided by the statistical language model 1006, in determining the overall probability score of the candidate word $w_z$. The statistical topic model can determine the theme of a word or n-gram in any manner, e.g., by projecting that word or n-gram into a semantic space using a DNN, etc.

The language generation component 1004 will predict an end-of-passage symbol </p> when it determines that the passage that it has produced in word-by-word fashion is complete. In response, the language generation component 1004 can advance to a next input image (or cluster of images) in the temporal sequence of input images. The language generation component 1004 processes the next input image in the manner described above, e.g., by using the loading component 1010 to load preliminary narrative information pertaining to this input image(s), and then generating the words of a passage in word-by-word fashion based on the newly loaded preliminary narrative information.

The album narrative as a whole corresponds to the concatenation of the separate textual passages formed in the above manner. This process will produce an overall coherent narrative, in part, because each passage that is generated for a particular input image (or cluster of input images) is dependent on the trailing words associated with the preceding passage, except with respect to the first textual passage.

In another implementation, the language generation component 1004 can aggregate all instances of preliminary narrative information associated with the set of input images, to produce global preliminary narrative information. The language generation component 1004 can thereafter generate the complete album narrative from beginning to end based on the global preliminary narrative information.

Overall, the language generation component 1004 can generate a description of a travel experience which mimics real users' accounts because it is conditioned by those real accounts. As a further consequence, the language generation component 1004 can produce an album that contains emotional content, not just a dry objective description of a scene. For instance, again assume that the input image shows a couple sitting together gazing at the Ponte Vecchio, as in the input image 306 of FIG. 3. The textual passages retrieved from the knowledgebase can be expected to include some references to romantic experiences, rather than, or in addition to, more objective accounts of the bridge under consideration.

The narrative creation component 1002 can also include an optional style transformation component 1012. The optional style transformation component 1012 maps each input sentence of the album narrative (output by the language generation component 1004) into a transformed sentence. The transformed sentence expresses the same concept and/or sentiment as the input sentence, but does so in a different style with respect to the input sentence. For instance, the transformed sentence can express the same concept and/or sentiment as the input sentence, but in a more poetic and artistic manner compared to the input sentence, e.g., by more heavily making use of metaphors, and by emphasizing the emotional impact of a scene. In one implementation, the style transformation component 1012 can perform the above-described task using an RNN model 1014. More particularly, the RNN model 1014 can correspond to an encoder-decoder type of RNN model which maps the input sentence into a vector, and then maps the vector into the transformed sentence. A training system produces the RNN model 1014 in an offline process based on a corpus of training data that maps literal descriptions to counterpart poetic descriptions.

In another case, the statistical language model 1006 used by the language generation component 1004 can incorporate the knowledge embodied in the style transformation component 1012. In other words, the statistical language model 1006 is trained to predict each word $w_z$ in a textual passage, as well as to form a textual passage that reflects a desired style. This single-model implementation could dispense with the use of the separate style transformation component 1012. But by including a separate style transformation phase (as shown in FIG. 10), an administrator can efficiently change the style of the narratives generated by the narrative creation component 1002. For example, the administrator can opt for a more laconic factual presentation by swapping out a poetic-based style transformation component with another kind of style transformation component.

FIG. 11 shows a second implementation of the narrative creation component 126, labeled in FIG. 11 as a narrative creation component 1102. A clustering component 1104 performs the same function as the clustering component 1008 of FIG. 10. That is, the clustering component 1104 can group the input images into temporally and/or thematically related subsets of images. The clustering component 1104 can perform this task in the manner described above, e.g., by mapping the input images (and/or the textual information associated therewith) into respective vectors in a semantic space, and then grouping together vectors that are similar to each other, as defined with respect to any environment-specific threshold of similarity. A data store 1106 stores information that defines the respective groups of related images.

A fragment selection component 1108, in cooperation with the knowledge lookup component 122, can provide an instance of preliminary narrative information for each cluster of input images. In one approach, the fragment selection component 1108 selects a representative input image from each cluster. The fragment selection component 1108 then commands the knowledge lookup component 122 to provide a particular textual passage associated with the representative input image, if not already provided by the knowledge lookup component 122. That particular textual passage may correspond to an actual textual passage that appears in some travel blog or other knowledge source. The fragment selection component 1108 can choose the representative input image based on any consideration, e.g., by randomly selecting the representative input image, or by choosing the input image which best meets certain image selection criteria (e.g., by picking the input image having a fc7 vector which is most closely associated with the presumed topical focus of the image).

In a second case, the fragment selection component 1108 can command the knowledge lookup component 122 to concatenate the album attribution information for all of the input images in a cluster, and then formulate a search query based on that assemblage of information. A search engine returns preliminary narrative information which matches the search query, with respect to any environment-specific criteria of matching.

In a third case, the fragment selection component 1108 can instruct the knowledge lookup component 122 to translate some or all of the album attribute information for a cluster into synthetic preliminary narrative information, e.g., using an RNN model or some other type of machine-learned statistical model.

In whatever manner formed, when finished, the fragment selection component 1108 provides a plurality of instances of preliminary narrative information for the respective clusters. It stores those instances in a data store 1110. Each instance of preliminary narrative information can include one or more sentences. For example, an instance of preliminary narrative information associated with a cluster of bridge-based images may include at least one sentence describing the history of the bridge, at least on sentence describing the appearance of the bridge, at least one sentence describing a typical emotional reaction to the bridge, and so on.

A fragment ordering component 1112 concatenates the separate instances of preliminary narrative information into a cohesive album narrative. The fragment ordering component 1112 can order the instances based on two general paradigms. First, assume, as in the case of FIG. 2, that the user captures a set of input images in a particular order over the course of a journey. As a first rule, the fragment ordering component 1112 can generally describes the clusters in the order in which the clusters were created. For example, the fragment ordering component 1108 will describe the input images pertaining to Venice before describing the input images pertaining to Florence, presuming, of course that the user visits Venice before Florence.

As a second ordering paradigm, within each cluster, the fragment ordering component 1112 can use a machine-learned statistical model 1114 to order the sentences associated with the cluster. A training system (not shown) can train the statistical model 1114 based on ordering of passages exhibited in actual travel narratives. Once trained, the statistical model 1114 will inherently capture patterns in the ordering of the passages.

For instance, in one environment, the statistical model 1114 will indicate that a user typically starts a narrative by explaining where he or she is located. The statistical model 1114 may then indicate that the user typically describes the principal landmarks or other objects within the captured scene(s). The statistical model may then indicate that the user may describe his or her reaction to the scene that is depicted, and so on. This ordering is cited merely by way of illustration, not limitation.

In operation, the fragment ordering component 1112 can classify the type of each sentence within an instance of preliminary narrative information. For instance, the fragment ordering component 1112 can determine whether a particular sentence describes the history of a landmark or an emotional reaction to the landmark, etc. The fragment ordering component 1112 then orders the sentences in an order based on their classifications and by the weighting parameters of the statistical model 1114.

FIG. 12 shows a third implementation of the narrative creation component 126, labeled in FIG. 12 as a narrative creation component 1202. Here, a template selection component 1204 can select a template for use in processing the complete set of input images, such as the complete set of input images 202 shown in FIG. 2. Or it can select a template for use in processing a particular subset of the input images, such as those images pertaining to the city of Venice. More specifically, the template selection component 1204 selects a template from a set of possible templates (provided in a data store 1206). The template selection component 1204 can make this selection based on the album attribute information associated with all of the input images or a subset of the input images. In either case, the template selection component 1204 can make such a selection by consulting a predetermined mapping table or the like. Such a mapping table might indicate, for instance, that a first type of template is more appropriate to hiking-type vacation as opposed to cruise-type vacations.

Presume that the selected template has boilerplate language interspersed with slot variables. For instance, as shown in FIG. 13, an illustrative template 1302 includes a plurality of predetermined phrases interspersed with slot variables. The slot variables correspond to the location that the user has visited, the time at which the user has visited the location, the landmarks captured by the input images, and so on.

A template-filling component 1208 examines the preliminary narrative information to identify values for the respective slot variables in the template. The template-filling component 1208 can perform this task using various approaches, such as by using a machine-learned statistical model 1210.

For instance, the statistical model 1210 may correspond to a machine-learned Conditional Random Fields (CRF) model. In this approach, a CRF model provides the most probable slot sequence defined by:

$$\hat{Y} = \underset{Y}{\mathrm{argmax}}\, p(Y \mid X). \quad (4)$$

In this equation, the term X refers to a sequence of tokens in the preliminary narrative information $(x_1, x_2, \ldots, x_T)$ and Y refers to a sequence of tags $(y_1, y_2, \ldots, y_T)$ assigned to the tokens, where the tags are selected from a set C of possible tags. The tags correspond to slot variables, such as the tags "location name," "weather conditions," "emotional reaction," etc. In the above example, the CRF model would determine that the term "Sardinia" corresponds to a location name, and therefore substitute this value into an appropriate slot within the selected template.

Finally, the annotated album creation component 128 (shown in FIG. 1) can produce an annotated album based on a predetermined composition template, or otherwise with respect to one or more predetermined composition rules. One composite template places album narrative portions next to (or otherwise is close proximity to) the respective input image to which they describe.

B. Illustrative Processes

Figure 14:
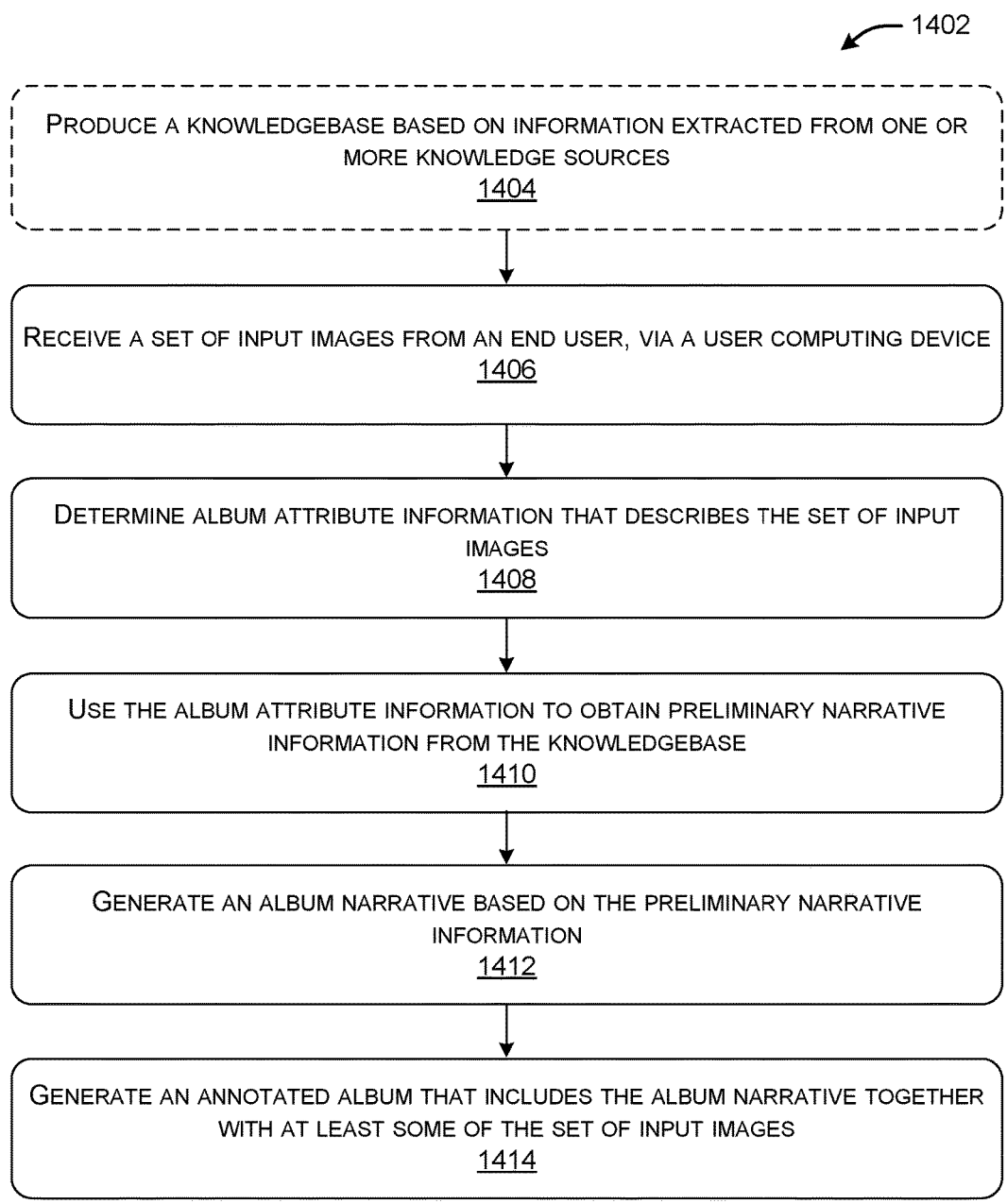
FIG. 14 is a flowchart that describes one manner of operation of the system of FIG. 1.

FIG. 14 shows a process 1402 that explains the operation of the system 102 of Section A in flowchart form. Since the principles underlying the operation of the system 102 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

In block 1404, the knowledge acquisition component 106 produces a knowledgebase based on information extracted from one or more knowledge sources. The knowledgebase maps a set of attributes that describes images to textual passages associated with the images. Further, at least one knowledge source corresponds to a primary knowledge source that provides a plurality of image-annotated textual narratives.

In block 1406, the narrative creation engine 108 receives a set of input images from an end user, via a user computing device. At least one image capture device produces the set of input images. The set of input images captures scenes at respective locations at respective times.

In block 1408, the narrative creation engine 108 determines album attribute information that describes the set of input images. In some implementations, the album attribute information includes a relationship attribute that describes a type of relationship among two or more people in at least one input image in the set of input images.

In block 1410, the narrative creation engine 108 uses the album attribute information to obtain preliminary narrative information from the knowledgebase. In block 1412, the narrative creation engine 108 generates an album narrative based on the preliminary narrative information. In block 1414, the narrative creation engine 108 generates an annotated album that includes the album narrative together with at least some input images in the set of input images.

C. Representative Computing Functionality

Figure 15:
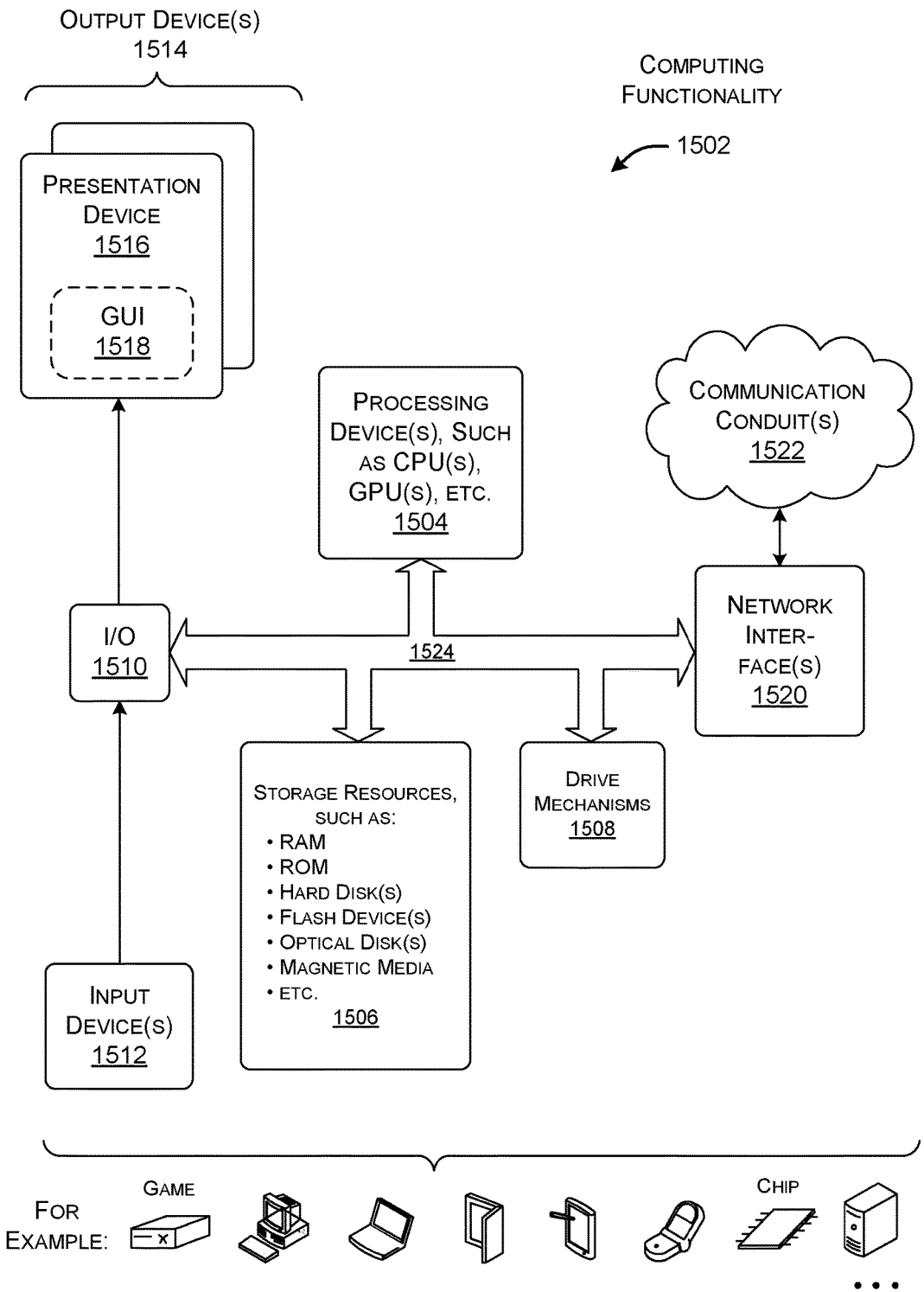
FIG. 15 shows illustrative computing functionality that can be used to implement any aspect of the features shown in the foregoing drawings.

FIG. 15 shows computing functionality 1502 that can be used to implement any aspect of the mechanisms set forth in the above-described figures. For instance, the type of computing functionality 1502 shown in FIG. 15 can be used to implement any of the knowledge acquisition component 106, the narrative creation engine 108, the user computing device 114, etc. of FIG. 1. In all cases, the computing functionality 1502 represents one or more physical and tangible processing mechanisms.

The computing functionality 1502 can include one or more hardware processor devices 1504, such as one or more central processing units (CPUs), and/or one or more graphical processing units (GPUs), and so on. The computing functionality 1502 can also include any storage resources (also referred to as computer-readable storage media or computer-readable storage medium devices) 1506 for storing any kind of information, such as machine-readable instructions, settings, data, etc. Without limitation, for instance, the storage resources 1506 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1502. The computing functionality 1502 may perform any of the functions described above when the hardware processor device(s) 1504 carry out computer-readable instructions stored in any storage resource or combination of storage resources. For instance, the computing functionality 1502 may carry out computer-readable instructions to perform each block of the process 1402 described in Section B. The computing functionality 1502 also includes one or more drive mechanisms 1508 for interacting with any storage resource, such as a hard disk drive mechanism, an optical disk drive mechanism, and so on.

The computing functionality 1502 also includes an input/output component 1510 for receiving various inputs (via input devices 1512), and for providing various outputs (via output devices 1514). Illustrative input devices include a keyboard device, a mouse input device, a touchscreen input device, a digitizing pad, one or more static image cameras, one or more video cameras, one or more depth cameras, one or more microphones, a voice recognition mechanism, any movement detection mechanisms (e.g., accelerometers, gyroscopes, etc.), and so on. One particular output mechanism may include a display device 1516 and an associated graphical user interface presentation (GUI) 1518. For instance, the computing functionality 1502 can present the annotated album 302 shown in FIG. 3 on the display device 1516. The display device 1516 may correspond to a charge-coupled display device, a cathode ray tube device, a projection mechanism, etc. Other output devices include a printer, one or more speakers, a haptic output mechanism, an archival mechanism (for storing output information), and so on. The computing functionality 1502 can also include one or more network interfaces 1520 for exchanging data with other devices via one or more communication conduits 1522. One or more communication buses 1524 communicatively couple the above-described components together.

The communication conduit(s) 1522 can be implemented in any manner, e.g., by a local area computer network, a wide area computer network (e.g., the Internet), point-to-point connections, etc., or any combination thereof. The communication conduit(s) 1522 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1502 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself The following summary provides a non-exhaustive list of illustrative aspects of the technology set forth herein.

According to a first aspect, a system, implemented by one or more computing devices, is described for creating a textual narrative. The system includes a knowledge acquisition component configured to produce a knowledgebase based on information extracted from one or more knowledge sources. The knowledgebase maps a set of attributes that describes images to textual passages associated with those images, at least one knowledge source corresponding to a primary knowledge source that provides a plurality of image-annotated textual narratives. The system also includes a data store for storing the knowledgebase. The system also includes a narrative creation engine, including: a user interface component configured to receive a set of input images from an end user, via a user computing device, the set of input images being produced by at least one image capture device, and the set of input images capturing scenes at respective locations at respective times; an album processing component configured to determine album attribute information that describes the set of input images; a knowledge lookup component configured to use the album attribute information to obtain preliminary narrative information from the knowledgebase; a narrative creation component configured to generate an album narrative based on the preliminary narrative information; and an annotated album creation component configured to generate an annotated album that includes the album narrative together with at least some of the input images in the set of input images. The user interface component is further configured to provide the annotated album to the end user.

According to a second aspect, the primary knowledge source provides a plurality of image-annotated textual travel narratives that capture travel experiences of users. Further, the set of input images corresponds to digital photographs that capture a particular travel experience of the end user.

According to a third aspect, at least one other knowledge source corresponds to a secondary knowledge source that provides background information regarding at least one topic described in the primary knowledge source.

According to a fourth aspect, the knowledge acquisition component is configured to produce the knowledgebase by: identifying source content items in the primary knowledge source, each of which includes at least one source image; for each particular source image associated with a particular source content item, generating source attribute information that describes the particular source image; and correlating the source attribute information with a text portion in the particular source content item that relates to the particular source image.

According to a fifth aspect, the album attribute information includes: a location attribute that describes a location associated with at least one input image in the set of input images; a time attribute that describes a capture time associated with at least one input image in the set of input images.

According to a sixth aspect, the album attribute information includes a relationship attribute that describes a type of relationship among two or more people in at least one input image in the set of input images.

According to a seventh aspect, the album attribute information includes one or more of: an object attribute that describes at least one object in at least one input image in the set of input images; and/or an action attribute that describes at least one action exhibited in at least one input image in the set of input images; and/or an environment attribute that describes at least one environmental condition exhibited in at least one input image in the set of input images; and/or an emotion attribute that describes a presumed emotion exhibited by at least one person associated with at least one input image in the set of input images.

According to an eighth aspect, the album processing component is configured to obtain at least some of the album attribute information from metadata associated with one or more of the input images.

According to a ninth aspect, the album processing component is configured to obtain at least some of the album attribute information from an automated caption-generating component.

According to a tenth aspect, the album processing component is configured to obtain at least some of the album attribute information by performing an image search operation.

According to an eleventh aspect, the narrative creation component corresponds to a language generation component that is configured to successively generate words in the album narrative based on a statistical machine-learned model.

According to a twelfth aspect, the language generation component is configured to bias words that it generates based on the preliminary narrative information extracted from the knowledgebase.

According to a thirteenth aspect, the narrative creation component includes a fragment ordering component configured to order text fragments associated with the preliminary narrative information, to produce the album narrative.

According to a fourteenth aspect, the fragment ordering component is configured to order the text fragments using a statistical machine-learned model.

According to a fifteenth aspect, the narrative creation component further includes: a clustering component configured to identify plural clusters associated with respective related groups of images; and a fragment selection component configured provide at least one text fragment for each respective cluster.

According to a sixteenth aspect, the narrative creation component includes: a template selection component configured to select a template based on the album attribute information; and a template-filling component configured to fill in slots within the template based on the preliminary narrative information.

According to a seventeenth aspect, a method is described, implemented by one or more computing devices, for creating a textual narrative. The method includes: producing a knowledgebase based on information extracted from one or more knowledge sources, the knowledgebase mapping a set of attributes that describes images to textual passages associated with the images, and at least one knowledge source corresponding to a primary knowledge source that provides a plurality of image-annotated textual narratives; receiving a set of input images from an end user, via a user computing device, the set input images being produced by at least one image capture device, and the set of input images capturing scenes at respective locations at respective times; determining album attribute information that describes the set of input images, the album attribute information including a relationship attribute that describes a type of relationship among two or more people in at least one input image in the set of input images; using the album attribute information to obtain preliminary narrative information from the knowledgebase; generating an album narrative based on the preliminary narrative information; and generating an annotated album that includes the album narrative together with at least some of the input images in the set of input images.

According to an eighteenth aspect, the primary knowledge source (referenced by the seventeenth aspect) provides a plurality of image-annotated textual travel narratives that capture travel experiences of ends users. Further, the set of input images corresponds to digital photographs that capture a particular travel experience of the end user.

According to a nineteenth aspect, a computer-readable storage medium is described for storing computer-readable instructions. The computer-readable instructions, when executed by one or more processor devices, perform a method that includes: receiving a set of input images from an end user, via a user computing device, the set input images being produced by at least one image capture device, and the set of input images capturing scenes at respective locations at respective times; determining album attribute information that describes the set of input images; using the album attribute information to obtain preliminary narrative information from a knowledgebase, the knowledgebase mapping a set of attributes that describes images to textual passages associated with the images; and generating an album narrative based on the preliminary narrative information.

According to a twentieth aspect, the album attribute information (referenced by the nineteenth aspect) includes a relationship attribute that describes a type of relationship among two or more people in at least one input image in the set of input images.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   a processing device; and
   a storage device storing computer-executable instructions which, when executed by the processing device, cause the processing device to:
   receive a set of input images produced by an image capture device, the set of input images capturing scenes at respective locations at respective times;
   extract input image attributes from the input images;
   based at least on the input image attributes, identify matching source images in a knowledgebase that match the input images;
   obtain preliminary narrative information from the matching source images;
   determine semantic classifications of text fragments of the preliminary narrative information;
   generate an album narrative for the set of input images by ordering the text fragments of the preliminary narrative information based at least in part on both the respective times of the set of input images and the semantic classifications of the text fragments;
   generate an annotated album that includes the album narrative together with at least some of the input images in the set of input images; and
   provide the annotated album to a user.

2. The system of claim 1, wherein the computer-executable instructions further cause the processing device to:
   obtain background information regarding at least one topic described in the preliminary narrative information from a secondary knowledge source;
   generate additional text fragments based at least in part on the background information; and
   use the additional text fragments in generating the album narrative.

3. The system of claim 1, wherein the computer-executable instructions further cause the processing device to:
   obtain an actual passage related to a topic of the input images; and
   order the text fragments of the preliminary narrative information by patterning a semantic classification order of the text fragments after the actual passage.

4. The system of claim 1, wherein the input image attributes include:
   a location attribute that describes a location associated with at least one input image in the set of input images;
   a time attribute that describes a capture time associated with at least one input image in the set of input images; and
   a relationship attribute that describes a type of relationship among two or more people in at least one input image in the set of input images.

5. The system of claim 1, wherein the input image attributes include
an emotion attribute that describes a presumed emotion exhibited by at least one person associated with at least one input image in the set of input images.

6. The system of claim 1, wherein the computer-executable instructions further cause the processing device to:
obtain at least some of the input image attributes by performing an image search operation.

7. The system of claim 1, wherein the computer-executable instructions further cause the processing device to:
successively generate words for the album narrative based at least on a statistical machine-learned model.

8. The system of claim 7, wherein the computer-executable instructions further cause the processing device to:
bias the generated words based at least on the preliminary narrative information extracted from the knowledgebase.

9. The system of claim 8, wherein the computer-executable instructions further cause the processing device to:
bias the generated words by determining a probability that a candidate word is the next successive word.

10. The system of claim 1, wherein the computer-executable instructions further cause the processing device to:
order the text fragments using a statistical machine-learned model.

11. The system of claim 1, wherein the computer-executable instructions further cause the processing device to:
identify input image clusters associated with respective related groups of the input images of the set; and
provide at least one text fragment for each respective input image cluster.

12. A method, implemented by one or more computing devices, comprising:
receiving a set of input images produced by an image capture device, the set of input images capturing scenes at respective locations at respective times;
extracting input image attributes from the input images;
based at least on the input image attributes, clustering the input images and selecting a representative image for an individual cluster of the input images;
identifying matching source images in a knowledgebase that match the representative image;
obtaining preliminary narrative information from corresponding textual passages in the knowledgebase associated with the matching source images;
based at least on the preliminary narrative information, generating an album narrative for the individual cluster by concatenating objective factual information corresponding to the representative image with a subjective reaction corresponding to the representative image; and
generating an annotated album that includes at least some of the input images in the individual cluster and the album narrative.

13. The method of claim 12,
wherein the corresponding textual passages in the knowledgebase represent a plurality of image-annotated textual travel narratives that capture travel experiences of travelers, and
wherein the set of input images corresponds to digital photographs that capture a new travel experience.

14. The method of claim 12, wherein the subjective reaction corresponds to a type of relationship among two or more people in the representative image.

15. The method of claim 14, wherein the type of relationship comprises a romantic relationship or a familial relationship.

16. The method of claim 12, further comprising:
presenting a request to a user to specify a type of a relationship between two people visible in the representative image;
receiving a response specifying the type of the relationship between the two people; and
generating, based at least in part on the type of the relationship, the subjective reaction as an expression of an emotional dimension between the two people.

17. The method of claim 12, further comprising:
generating the subjective reaction based at least in part on results from a search for a typical emotional response to visible content in the representative image.

18. A computer-implemented method comprising:
receiving a set of input images produced by at least one image capture device, the set of input images capturing scenes at respective locations at respective times;
determining input image attributes that describe the set of input images;
using the input image attributes to obtain preliminary narrative information from a knowledgebase, the knowledgebase mapping source image attributes of source images to textual passages associated with the source images; and
generating an album narrative for the set of input images based at least on concatenating individual textual passages that include objective factual information from the preliminary narrative information with at least one synthetic textual passage that includes an expression of an emotional dimension of a representative image of the input images.

19. The computer-implemented method of claim 18, further comprising:
obtaining the preliminary narrative information by matching at least some of the input image attributes to at least some of the source image attributes of the knowledgebase to find matching source images.

20. The computer-implemented method of claim 18, further comprising:
generating the synthetic textual passage based at least in part on a relationship of people visible in the representative image.

* * * * *